United States Patent
Motoyama

(10) Patent No.: US 8,573,591 B2
(45) Date of Patent: Nov. 5, 2013

(54) OPTICAL READER, CONTROL METHOD OF OPTICAL READER, AND COMPUTER-READABLE RECORDING MEDIUM THAT SHORTENED FIRST TRANSPORT DISTANCE OF MEDIUM

(75) Inventor: Hiroyuki Motoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 470 days.

(21) Appl. No.: 13/006,166

(22) Filed: Jan. 13, 2011

(65) Prior Publication Data

US 2011/0170147 A1 Jul. 14, 2011

(30) Foreign Application Priority Data

Jan. 13, 2010 (JP) ................. 2010-004902

(51) Int. Cl.
*B65H 5/34* (2006.01)
(52) U.S. Cl.
CPC ...................... *B65H 5/34* (2013.01)
USPC .............. 271/225; 271/264; 399/15; 399/16; 194/207; 358/1.5; 358/1.12; 382/137; 382/138; 382/139; 382/140; 382/180; 382/193; 382/199
(58) Field of Classification Search
USPC ............. 271/264, 225, 265.01; 399/9, 15, 16; 209/534; 194/206, 207; 358/1.5, 1.12, 358/496–498; 382/135, 137–140, 175–178, 382/180, 193, 199
See application file for complete search history.

(56) References Cited

U.S. PATENT DOCUMENTS

| | | | | |
|---|---|---|---|---|
| 5,323,473 A | * | 6/1994 | Lau | ................................ 382/175 |
| 6,490,059 B1 | | 12/2002 | Esquibel et al. | |
| 2005/0090912 A1 | * | 4/2005 | Ichikawa et al. | ................ 700/66 |
| 2011/0170151 A1 | * | 7/2011 | Motoyama | .................... 358/474 |
| 2012/0019878 A1 | * | 1/2012 | Motoyama | .................... 358/474 |

FOREIGN PATENT DOCUMENTS

| | | | |
|---|---|---|---|
| JP | 5-003524 A | | 1/1993 |
| JP | 5-036450 U | | 5/1993 |
| JP | 2004-23719 A | | 1/2004 |
| JP | 2004-72152 A | | 3/2004 |
| JP | 2009-284191 A | | 12/2009 |
| JP | 2009284191 A | * | 12/2009 |
| JP | 2011155550 A | * | 8/2011 |

* cited by examiner

*Primary Examiner* — Gerald McClain
(74) *Attorney, Agent, or Firm* — Nutter McClennen & Fish LLP; John J. Penny, V

(57) ABSTRACT

An optical reader is provided. A transport section is capable of transporting a medium which is a reading target in forward and backward directions along a transport path. An optical reading section is installed in the transporting path. The optical reading section optically reads the medium which is transported by the transport section. A control section sets a transport direction of the medium at the time of reading of the medium on the basis of a position of the medium before or when the reading of the medium is started and a reading position of the optical reading section such that a transport distance of the medium until the reading of the medium is completed is shortened, and controls the transport section and the optical reading section.

11 Claims, 12 Drawing Sheets

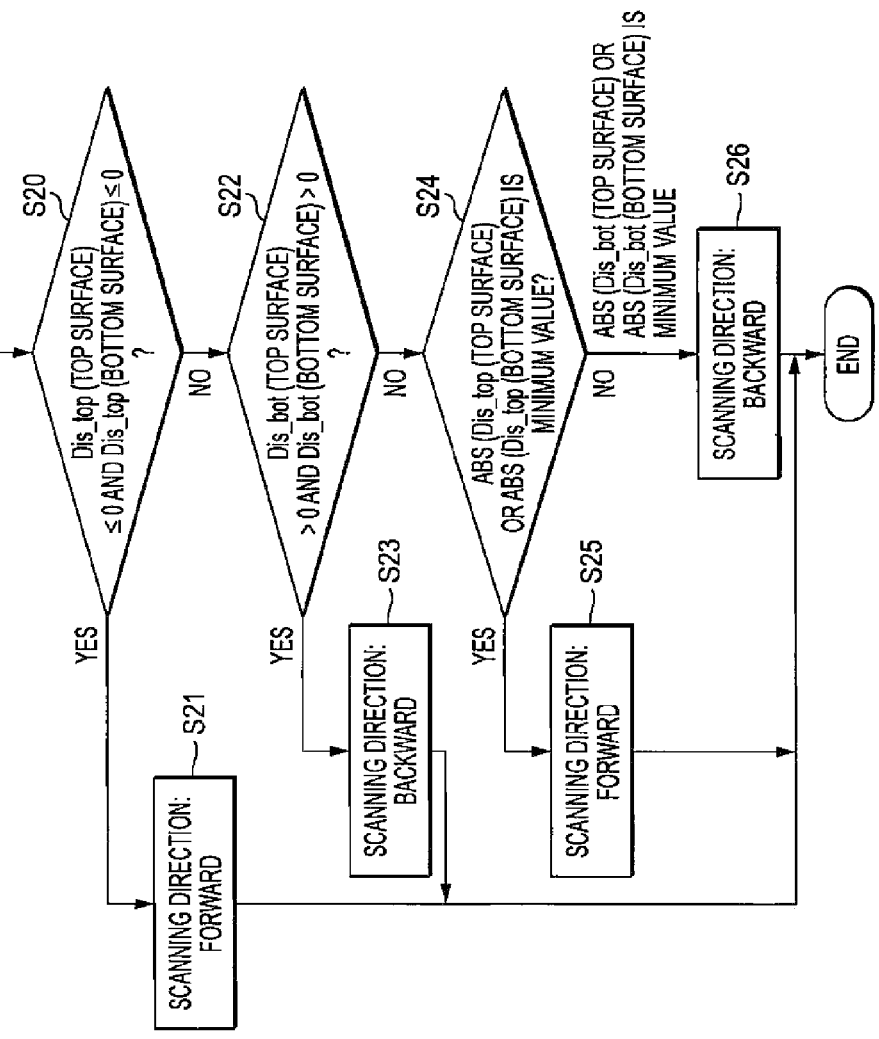

OPTICAL READER, CONTROL METHOD OF OPTICAL READER, AND COMPUTER-READABLE RECORDING MEDIUM THAT SHORTENED FIRST TRANSPORT DISTANCE OF MEDIUM

The disclosures of Japanese Patent Applications No. 2010-004902 filed on Jan. 13, 2010, including specifications, drawings and claims are incorporated herein by reference in their entireties.

BACKGROUND

The present invention relates to an optical reader which transports a medium and optically reads the medium, a control method of the optical reader, and a computer-readable recording medium.

In general, an optical reader such as a scanner device which is connected with a host computer stores an image obtained by reading an original document in a buffer memory, and sends the image stored in the buffer memory to the host computer after the original document is completely read (refer to Patent Document 1, for example).

Patent Document 1: JP-A-2009-284191

In this regard, the transport and reading of a recording paper (medium) for scanning can be performed in a forward or backward direction, and in either case, data processing is possible.

However, in an optical reader in the related art, it is necessary that a scanning direction is set in advance using a control command regardless of the current position of the recording paper.

Thus, for example, in the case of backward direction scanning, if forward direction scanning is designated by a control command although a reading target position is close to an image reading sensor (for example, CIS: Contact Image Sensor), it is necessary for the paper to be considerably pulled back once before a scanning operation, which unnecessarily lengthens a paper transport time, thereby lowering throughput.

SUMMARY

It is therefore an object of at least one embodiment of the present invention to provide an optical reader, a control method of the optical reader and a computer-readable recording medium which is capable of suppressing unnecessary transport of a recording paper (medium) during a scanning preparation operation for scanning or after a scanning operation to thereby enhance throughput.

In order to achieve the above-described objects, according to a first aspect of the embodiments of the present invention, there is provided an optical reader, comprising: a transport section capable of transporting a medium which is a reading target in forward and backward directions along a transport path; an optical reading section installed in the transporting path, the optical reading section that optically reads the medium which is transported by the transport section; and a control section that sets a transport direction of the medium at the time of reading of the medium on the basis of a position of the medium before or when the reading of the medium is started and a reading position of the optical reading section such that a transport distance of the medium until the reading of the medium is completed is shortened, and controls the transport section and the optical reading section.

With such a configuration, the control section sets the transport direction at the time of the medium reading before the reading of the optical reading section so that the transport distance of the medium until the medium reading is completed is shortened, transports the medium which is the reading target medium in the forward or backward direction along the transport path using the transport section, and optically reads the medium transported by the transport section using the optical reading section, thereby making it possible to suppress unnecessary transport of the medium during a preparation operation for optically reading the medium while transporting the medium or after a reading operation, and to enhance throughput. For example, if the medium is transported in a direction where the position (of a reading target area) of the medium and the reading position of the optical reading section become closer to each other, efficiency is good.

In the optical reader, the control section may set the transport direction of the medium on the basis of arrangement of edge positions of both edges of a reading target area along the transport direction of the medium before or when the reading of the medium is started and the reading position of the optical reading section.

With such a configuration, the transport direction is set on the basis of the arrangement of the edge positions of both edges along the transport direction of the medium when the reading is started and the reading position of the optical reading section, and thus, it is possible to reliably determine unnecessary transport during a preparation operation for optically reading the medium while transporting the medium or after a reading operation, and to enhance throughput. For example, if the medium is transported in a direction where the position of the reading target area of the medium and the reading position of the optical reading section become closer to each other, efficiency is good.

In the optical reader, the optical reading section may include a first reading section that reads one surface of the medium and a second reading section that reads the other surface of the medium, the first reading section and the second reading section being respectively disposed on both sides of the transport path, and the control section may set the transport direction of the medium such that the transport distance of the medium until the reading of the medium by the first reading section and the second reading section is completed is shortened, in a case where the reading of both surfaces of the medium is performed simultaneously by the first reading section and the second reading section. Accordingly, even in a case where both of the surfaces of the medium are read together, it is possible to suppress unnecessary transport of the medium during a preparation operation for optically reading the medium while transporting the medium or after a reading operation, and to enhance throughput. For example, if the medium is transported in a direction where the position (of the reading target area) of the medium and the reading position of either the first reading section or the second reading section become closer to each other, efficiency is good.

In the optical reader, the control section may determine a reading preparation position in a direction which is closer to an edge portion of a reading target area of the medium, among the forward and backward directions, in a case where the reading target area is present over the medium reading position of the optical reading section, and set the transport direction of the medium on the basis of the reading preparation position. Accordingly, even in a case where the reading target area is present over the medium reading position of the optical reading section, it is possible to reliably enhance throughput. For example, if the reading preparation position is determined in the direction which is closer to the edge section of the reading target area, the medium is temporarily moved in a direction closer to the reading preparation position, and then the medium is read while being transported in a reverse direction, efficiency is good.

In the optical reader, the control section may set the transport direction of the medium so as to coincide with a discharge direction of the medium, in a case wherein the discharge direction of the medium is determined in advance. Accordingly, even in a case where the discharge direction is determined in advance, it is possible to reliably suppress unnecessary transport of the medium and to enhance throughput. For example, when it is determined that the medium is to be discharged from a specific discharge port in a case where the discharge port of the medium can be provided at two places of the front surface side and the rear surface side of the optical reader or in similar cases, if a direction toward the specific discharge port may be used as a transport direction at the time of reading, efficiency is good. The front surface side is a side in front of an operator and thus is an insert side, but whether the medium is to be discharged to the front surface side or the rear surface side is selectable according to operation situations.

In the optical reader, the control section may set the transport direction such that the transport distance when the medium is transported in the transport direction is shorter than the transport distance when the medium is transported in a direction different from the transport direction.

According to a second aspect of the embodiments of the present invention, there is provided a control method of an optical reader including a transport section capable of transporting a medium which is a reading target in forward and backward directions along a transport path; and an optical reading section installed in the transporting path, the optical reading section that optically reads the medium which is transported by the transport section, the control method comprising: setting a transport direction of the medium at the time of reading of the medium on the basis of a position of the medium before or when the reading of the medium is started and a reading position of the optical reading section such that a transport distance of the medium until the reading of the medium is completed is shortened; and controlling the transport section and the optical reading section on the basis of the set transport direction.

By performing the above-described control method, the transport direction at the time of the medium reading is set to shorten the transport distance of the medium until the medium reading is completed on the basis of the position of the medium when the reading is started and the reading position of the optical reading section, the medium which is the reading target is transported forward or backward direction along the transport path by the transport section, and the medium being transported by the transport section is optically read by the optical reading section, and thus, it is possible to suppress unnecessary transport of the medium during a preparation operation for optically reading the medium while transporting the medium or after a reading operation, and to enhance throughput. For example, if the medium is transported in a direction where the position of the medium and the reading position of the optical reading section become closer to each other, efficiency is good.

In the control method of the optical reader, the controlling may include setting the transport direction of the medium on the basis of arrangement of edge positions of both edges of a reading target area along the transport direction of the medium before or when the reading of the medium is started and the reading position of the optical reading section.

By performing the above-described control method, the transport direction is set on the basis of the arrangement of the edge positions of both edges of the medium along the transport direction when the reading is started and the reading position of the optical reading section, and thus, it is possible to reliably determine unnecessary transport of the medium during a preparation operation for optically reading the medium while transporting the medium or after a reading operation, and to enhance throughput. For example, if the medium is transported in a direction where the position of the reading target area of the medium and the reading position of the optical reading section become closer to each other, efficiency is good.

In the control method of the optical reader, the optical reading section may include a first reading section that reads one surface of the medium and a second reading section that reads the other surface of the medium, the first reading section and the second reading section being respectively disposed on both sides of the transport path, and the controlling may include setting the transport direction of the medium such that the transport distance of the medium until the reading of the medium by the first reading section and the second reading section is completed is shortened, in a case where the reading of both surfaces of the medium is performed simultaneously by the first reading section and the second reading section. Accordingly, even in a case where both of the surfaces of the medium are read together, it is possible to suppress unnecessary transport of the medium during a preparation operation for optically reading the medium while transporting the medium or after a reading operation, and to enhance throughput. For example, if the medium is transported in a direction where the position (of the reading target area) of the medium and the reading position of either the first reading section or the second reading section become closer to each other, efficiency is good.

In the control method of the optical reader, the controlling may include determining a reading preparation position in a direction which is closer to an edge portion of a reading target area of the medium, among the forward and backward directions, in a case where the reading target area is present over the medium reading position of the optical reading section, and setting the transport direction of the medium on the basis of the reading preparation position.

Accordingly, even in a case where the reading target area is present over the medium reading position of the optical reading section, it is possible to reliably enhance throughput. For example, if the reading preparation position is determined in the direction which is closer to the edge section of the reading target area, the medium is temporarily moved in a direction closer to the reading preparation position, and then the medium is read while being transported in a reverse direction, efficiency is good.

In the control method of the optical reader, the controlling may include setting the transport direction of the medium so as to coincide with a discharge direction of the medium, in a case wherein the discharge direction of the medium is determined in advance. Accordingly, even in a case where the discharge direction is determined in advance, it is possible to reliably suppress unnecessary transport of the medium and to enhance throughput. For example, when the medium is determined to be discharged through a specific discharge port in a case where the discharge port of the medium can be provided at two places of the front surface side and the rear surface side of the optical reader or in similar cases, if a direction toward the specific discharge port is used as a transport direction at the time of reading, efficiency is good. The front surface side is a side in front of an operator and thus is an insert side, but whether the medium is to be discharged to the front surface side or the rear surface side is selectable according to the operating situation.

In the control method of the optical reader, the transport direction may be set such that the transport distance when the medium is transported in the transport direction is shorter than the transport distance when the medium is transported in a direction different from the transport direction.

According to third aspect of the embodiments of the present invention, there is provided a computer-readable recording medium that stores a program which causes a control section that controls an optical reader including a transport section capable of transporting a medium which is a reading target in forward and backward directions along a transport path; and an optical reading section installed in the transporting path, the optical reading section that optically reads the medium which is transported by the transport section, to perform a control method comprising: setting a transport direction of the medium at the time of reading of the medium on the basis of a position of the medium before or when the reading of the medium is started and a reading position of the optical reading section such that a transport distance of the medium until the reading of the medium is completed is shortened; controlling the transport section to transport the medium on the basis of the set transport direction; and controlling the optical reading section to optically read the medium on the basis of the set transport direction.

By executing the program according to the embodiment by the control section, the transport direction at the time of the medium reading is set to shorten the transport distance of the medium until the medium reading is completed on the basis of the position of the medium before or when the reading is started and the reading position of the optical reading section, the medium which is the reading target is transported forward or backward direction along the transport path by the transport section, and the medium being transported by the transport section is optically read by the optical reading section, and thus, it is possible to suppress unnecessary transport of the medium during a preparation operation for optically reading the medium while transporting the medium or after a reading operation, and to enhance throughput. For example, if the medium is transported in a direction where (one edge of) the position of the reading target area of the medium and the reading position of the optical reading section become closer to each other, efficiency is good.

According to the embodiments of the present invention, it is possible to suppress unnecessary transport during a preparation operation for optically reading the medium while transporting the medium or after a reading operation, and to enhance throughput.

DETAILED DESCRIPTION OF THE EMBODIMENTS

Hereinafter, an embodiment according to the present invention will be described with reference to the accompanying drawings.

Figure 1:
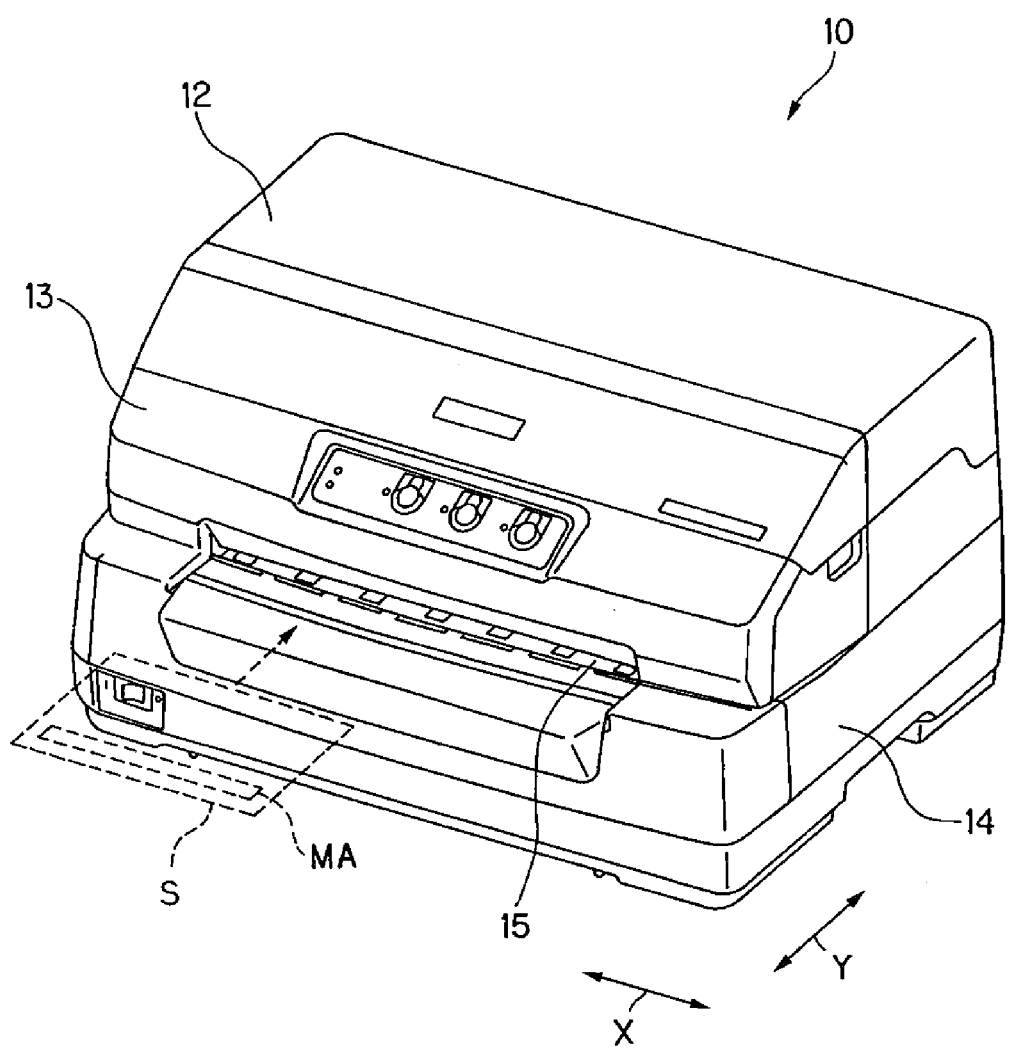
FIG. 1 is a perspective view illustrating an external appearance of a dot impact printer according to an embodiment.
Figure 2:
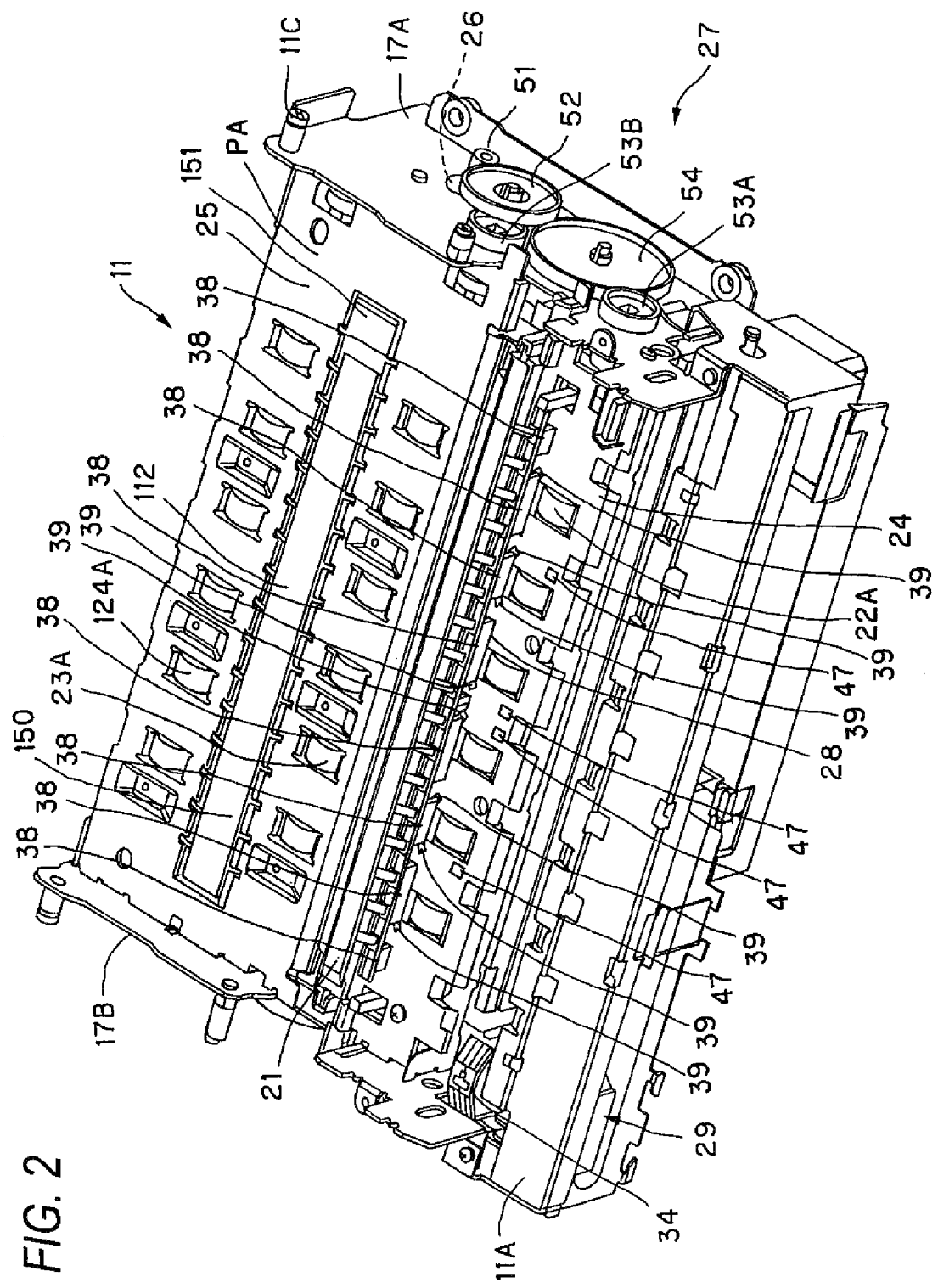
FIG. 2 is a perspective view illustrating a printer body.
Figure 3:
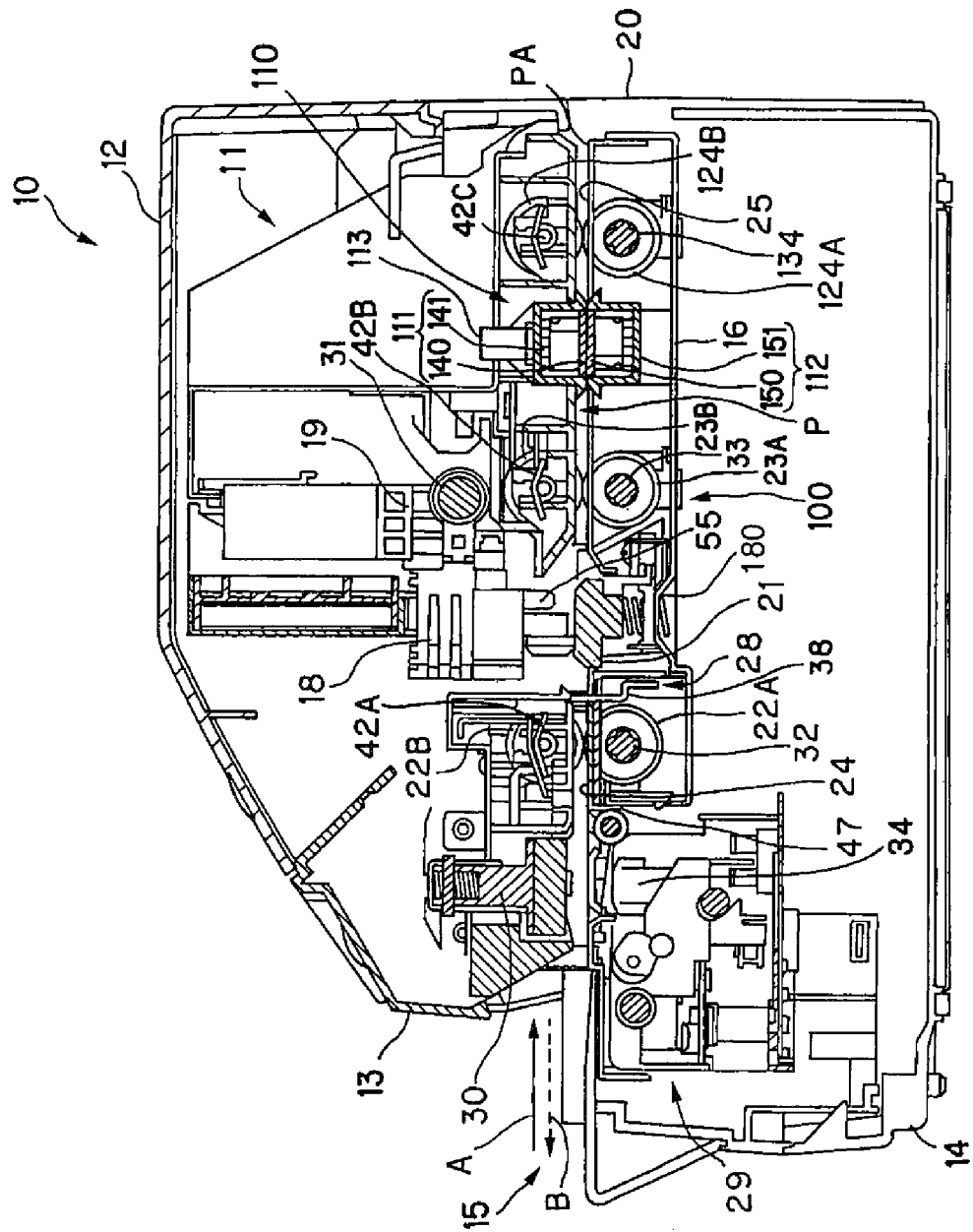
FIG. 3 is a side sectional view illustrating a printer body.

FIG. 1 is a front perspective view illustrating an external appearance of a dot impact printer according to an embodiment of the present invention. FIG. 2 is a perspective view of an external appearance illustrating a printer body 11. FIG. 3 is a side sectional view illustrating a dot impact printer 10 in FIG. 1.

The dot impact printer 10 in FIG. 1 presses down a plurality of recording wires included in a recording head 18 (see FIG. 3) against a recording medium S using an ink ribbon (not shown) reeled out of a ribbon cartridge (not shown) and forms dots on a recording surface of the recording medium S, to thereby record an image including characters. The dot impact printer 10 includes an optical reader 110 (see FIG. 3), and may also serve as an optical reader to optically read characters, symbols, images or the like, displayed on the surface of the recording medium S.

A cut medium which is cut with a predetermined length and a continuous paper having plural sheets of papers connected to each other are exemplified as the recording medium S (medium) capable of being used in the dot impact printer 10. The cut medium includes, for example, a passbook, a post card, an envelope or the like, in addition to cut paper, cut copying paper or the like, and the continuous paper includes continuous copying paper and fan fold paper connected with perforations or the like. In this embodiment, a check or payment slip (hereinafter, generally referred to as "check") issued by financial institutions or the like, or a passbook issued by financial institutions or the like is used as the recording medium S. The check is cut paper in which MICR (Magnetic Ink Character Recognition) information such as an account number of a user or a serial number of the check is printed with magnetic ink in an area MA which is part of the surface thereof. The passbook is a type of a book in which plural sheets of recording papers are bound, in which an inner surface when the book is opened serves as a recording surface. In a rear surface corresponding to a back cover of the passbook, a magnetic strip is attached.

Hereinafter, a side which enters the dot impact printer 10, among four sides of a rectangular recording medium S, is referred to as a leading edge, and a side which is opposite to the leading edge is referred to as a trailing edge.

As shown in FIG. 1, the dot impact printer 10 includes an upper cover 12, an upper case 13 and a lower case 14 as an external body. An insert port 15 through which the recording medium S is inserted and discharged is opened on a front surface of the upper case 13 and the lower case 14. On the other hand, a discharge port 20 through which the recording medium S is discharged is opened on a rear surface of the upper case 13 and the lower case 14. Whether the recording medium S processed by the dot impact printer 10 is discharged through the insert port 15 or discharged through the discharge port 20 can be set by a command transmitted to the dot impact printer 10 from a host computer 200 which will be described later. A side on which the insert port 15 is opened, that is, a left side in FIG. 3 is referred to as a front side, and a side on which the discharge port 20 is opened, that is, a right side in FIG. 3 is referred to as a rear side.

As shown in FIG. 2, the dot impact printer 10 includes a printer body 11 covered by the external body. The printer body 11 includes a lower body 11A and an upper body (not shown) supported by an axis 11C in a rear end section of the lower body 11A. The upper body can be rotated by operation of an opening-closing lever (not shown) installed on a left side surface of the upper body, and the inside of the printer body 11 is exposed as the upper body rotates.

As shown in FIGS. 2 and 3, the printer body 11 includes a base frame 16 and a pair of right side frame 17A and left side frame 17B which are fixed on both end sections of the base frame 16. There are side frames (not shown) of the upper body outside the side frames 17A and 17B, and a carriage guide shaft 31 spans therebetween. A front medium guide 24 and a rear medium guide 25 having a flat shape are fixedly installed between the side frames 17A and 17B.

A flat platen 21 is disposed between the front medium guide 24 and the rear medium guide 25, and a recording head 18 is disposed so as to face the platen 21, above the platen 21.

The recording head 18 is mounted on a carriage 19 which is slidably engaged with the carriage guide shaft 31. The carriage 19 is driven through a timing belt (not shown) by a forward or backward rotation of a carriage driving motor 56 (see FIG. 4) which drives the carriage 19, and is guided by the carriage guide shaft 31 to reciprocate. The carriage 19 is scanned in a reciprocating manner between the side frames of the upper body, in a direction indicated by a sign X in FIG. 1, that is, in a main scanning direction which coincides with a shaft direction of the carriage guide shaft 31 and a length direction of the platen 21. A direction perpendicular to the main scanning direction X of the carriage 19, that is, a direction indicated by a sign Y in FIG. 1 is referred to as a sub scanning direction.

While moving with the carriage 19, the recording head 18 mounted on the carriage 19 allows a recording wire to protrude from a wire protruding section (not shown) facing the platen 21 in a tip section of the recording head 18 to strike an ink ribbon, and allows ink from the ink ribbon to be attached to the recording medium S transported between the platen 21 and the recording head 18, to thereby record an image including characters on the recording medium S. The ink ribbon is rolled and stored in a ribbon cartridge (not shown) which is installed in the body frame or carriage 19, and is reeled out according to the scanning of the carriage 19. Further, on a rear side of the recording head 18, as shown in FIG. 3, a medium width sensor 55 is disposed above the platen 21. The medium width sensor 55 is mounted on the carriage 19 to scan the platen 21 together with the carriage 19, and is used for calculating a position of a side edge of the recording medium S or a width of the recording medium S.

As shown in FIGS. 2 and 3, the platen 21 is extended in a travel direction of the carriage 19 and is formed in a flat shape. The platen 21 is biased toward the recording head 18 and is elastically supported by a bias spring 180. The bias spring 180 is a compression coil spring. A protrusion force of the recording wire at the time of a recording operation of the recording head 18 is supported by a bias force of the bias spring 180. Further, when the thickness of the recording medium S is changed during transport of the recording medium S, or when a recording medium S having a different thickness is input into the printer body 11, the platen 21 is pressed by the tip end of the recording head 18 against the bias force of the bias spring 180, to move in a direction away from the recording head 18. Thus, regardless of the thickness of the recording medium, a gap between the tip end of the recording head 18 and the recording surface of the recording medium S is uniformly secured.

As shown in FIG. 3, the printer body 11 includes a medium transport mechanism (transport section) 100 which transports the recording medium S, an alignment mechanism 28 which hits up against a leading edge of the recording medium S transported by the medium transport mechanism 100 to align the recording medium S, a magnetic data reading/writing section 29 which includes a magnetic head 34 which performs reading of MICR information provided in a check or performs reading or writing of magnetic information on the magnetic strip provided in a passbook, and a medium pressing section 30 which presses the recording medium S from above to control uplift of the recording medium S, when the magnetic head 34 of the magnetic data reading section 29 performs a magnetic information process including the reading of MICR information.

As shown in FIGS. 2 and 3, the medium transport mechanism 100 includes the platen 21, a first driving roller 22A, a first driven roller 22B, a second driving roller 23A, a second driven roller 23B, a third driving roller 124A, a third driven roller 124B, a front medium guide 24, a rear medium guide 25, a medium transport motor 26 and a driving gear train section 27. The medium transport mechanism 100 forms a transport path P which transports the recording medium S through each roller on the front medium guide 24 and the rear medium guide 25, and top surfaces of the front medium guide 24 and the rear medium guide 25 form a transport surface PA of the transport path P.

In this configuration, the first driving roller 22A and the first driven roller 22B are disposed on a front side of the printer body 11 with reference to the platen 21 and the recording head 18, and the second driving roller 23A, the second driven roller 23B, the third driving roller 124A and the third driven roller 124B are sequentially disposed on a rear side of the printer body 11 with reference to the platen 21 and the recording head 18.

The first driving roller 22A and the first driven roller 22B are disposed vertically to make a pair, and the second driving roller 23A and the second driven roller 23B are disposed vertically to make a pair, and the third driving roller 124A and the third driven roller 124B are disposed vertically to make a pair.

The first driving roller 22A, the second driving roller 23A and the third driving roller 124A are driving rollers which are rotated by the medium transport motor 26 and the driving gear train section 27, and the first driven roller 22B, the second driven roller 23B and the third driven roller 124B are driven rollers which are elastically biased by springs 42A, 42B and 42C with a predetermined pressure to the side of the first driving roller 22A, the second driving roller 23A, and the third driving roller 124A, respectively. Thus, the first driving roller 22A and the first driven roller 22B rotate in opposite directions, the second driving roller 23A and the second driven roller 23B rotate in opposite directions, and the third driving roller 124A and the third driven roller 124B rotate in opposite directions.

As shown in FIG. 2, the driving gear train section 27 is disposed outside of the right side frame 17A. The driving gear train section 27 includes a motor pinion 51 which is fixed to integrally rotate with a driving shaft of the medium transport motor 26 which can rotate forward or backward. A driving force from the motor pinion 51 is transmitted to a second driving gear 53B installed to a second roller shaft 33 of the second driving roller 23A through a reduction gear 52, and is transmitted to the first driving gear 53A which is installed to the first roller shaft 32 of the first driving roller 22A through an intermediate gear 54 from the second driving gear 53B. Further, torque of the second roller shaft 33 of the second driving roller 23A is transmitted to a third roller shaft 134 of the third driving roller 124A by a driving belt (not shown), for example. Thus, the first driving roller 22A, the second driving roller 23A, and the third driving roller 124A shown in FIG. 3 rotate in the same direction, to thereby transport the recording medium S in the printer body 11. That is, the first driving roller 22A, the second driving roller 23A, and the third driving roller 124A shown in FIG. 3 transport the recording medium S in the printer body 11 as indicated by the sign A in the figure along the sub scanning direction Y when the medium transport motor 26 rotates forward, and transport the recording medium S in a direction to be discharged from the printer body 11 as indicated by the sign B in the figure when the medium transport motor 26 rotates in reverse.

The alignment mechanism 28 aligns the recording medium S before performing recording on the recording medium S using the recording head 18 or reading of a surface of the recording medium S using the optical reader 110. The alignment mechanism 28 includes a plurality of alignment plates 38 which is aligned between the first driving roller 22A and the first driven roller 22B, and the recording head 18 and the platen 21 in a main scanning direction and protrudes into the transport path P, and an alignment motor 58 (see FIG. 4) which drives the alignment plates 38. Further, the alignment mechanism 28 allows these alignment plates 38 to hit up against the leading edge of the recording medium S, to thereby align the direction of the recording medium S.

As shown in FIG. 2, the printer body 11 includes a plurality of alignment sensors 39 which detects the presence or absence of the recording medium S hitting up against the alignment plates 38 near an upstream side of the alignment plates 38 in the transport path P. The alignment sensors 39 are light-transmissive sensors which include a light emitting section (LED or the like) and a light receiving section (photo transistor or the like) which are each disposed opposite to each other with the transport path P being interposed therebetween, and are disposed in parallel in the main scanning direction. It can be determined whether an inclination to the transport direction of the recording medium S after alignment by the alignment mechanism 28 is within an allowable range, on the basis of the number and arrangement of sensors which detect the leading edge of the recording medium S among the plurality of alignment sensors 39.

Further, the dot impact printer 10 includes a control board section (not shown) provided under the rear side of the printer body 11, for example, as a control section which controls the overall dot impact printer 10, such as a driving control of the medium transport motor 26, a travel control of the carriage 19, a control of a recording operation due to the recording wire of the recording head 18, a control of a reading operation of the optical reader 110, or the like.

In the printer body 11, at a front side of the first driving roller 22A, a plurality of medium edge sensors 47 which detect insertion of the recording medium S to the transport path P are aligned. The medium edge sensors 47 are light reflective sensors which include a light emitting section which emits light to the transport path P, and a light receiving section which detects reflected light, and detect the recording medium S inserted through the insert port 15. The medium edge sensors 47 may be light transmissive sensors which include a light emitting section and a light receiving section disposed opposite to each other with the transport path P being interposed therebetween. In this configuration, in a case where light receiving is blocked in any one of the medium edge sensors 47 in the light receiving section of all the medium edge sensors 47 from a light received state, it is determined that the recording medium S is inserted through the transport path P.

Further, as shown in FIG. 3, the printer body 11 includes the optical reader 110 (optical reading section) which reads a character, a sign, an image or the like displayed on a surface of the recording medium S. The optical reader 110 includes a first scanner (first reading section) 111 which reads information displayed by printing or the like on an upper surface side of the recording medium S, and a second scanner (second reading section) 112 which is disposed opposite to the first scanner 111 and reads information displayed by printing or the like on a lower surface side of the recording medium S. Normally, the recording medium S is inserted through the insert port 15 so that a surface on which the MICR information is printed becomes a lower surface.

The first scanner 111 and the second scanner 112 are optical image sensors which continuously read information on the recording medium S which is transported on the transport path P and which are disposed between the second driving roller 23A and the third driving roller 124A.

The first scanner 111 and the second scanner 112 are image reading sensors of a CIS (contact image sensor) type, for example, and respectively include flat cover glasses 140 and 150 which come into close contact with the recording medium S, and body cases 141 and 151 which hold the cover glasses 140 and 150. Inside of the body cases 141 and 151 are respectively stored a light emission section (not shown) which emits light output from a light source such as an LED to a reading area of the recording medium S, a plurality of light receiving sensors (not shown) which is aligned in a line in the main scanning direction (X direction), and an output section (not shown) which outputs a signal from the light receiving sensor to the control board section. In this embodiment, the first scanner 111 and the second scanner 112 may include a CCD (charge coupled device), instead of the CIS. Further, as shown in FIG. 2, the second scanner 112 includes the body case 151 and the cover glass 150 which extend in a width direction of the dot impact printer 10 approximately in parallel with the platen 21 and have a longitudinal shape. The body case 151 is disposed so that an upper surface (glass surface) of the cover glass 150 is exposed to the transport path P through an opening formed in the rear medium guide 25. As shown in FIG. 3, the first scanner 111 is disposed above the second scanner 112 so that a lower surface (glass surface) of the cover glass 140 faces an upper surface of the cover glass 150, and has a longitudinal shape having approximately the same length as in the second scanner 112 in the width direction.

A bias member 113 is disposed over the first scanner 111, and the first scanner 111 is biased so as to be moved close to the recording medium S of the rear medium guide 25 by the bias member 113. Further, the bias member 113 presses the first scanner 111 toward the side of the second scanner 112 with approximately the same uniform force over the width direction. Here, the bias member 113 may employ a coil spring, a plate spring or a cushion member made of elastomer, or the like. A gap to which a recording medium having a predetermined thickness can be inserted is provided between glass surfaces of the cover glasses 140 and 150. When the recording medium S is read, the first scanner 111 is made to retreat upward by the transported recording medium S, and the bias member 113 shrinks, so that the recording medium S can pass between the cover glasses 140 and 150. That is, in the optical reader 110, the recording medium S is pushed toward the side of the second scanner 112 by the first scanner 111 biased by the bias member 113, and thus, the recording medium S and the glass surfaces of the cover glasses 140 and 150 are closely attached to each other, to thereby enhance reading quality.

Light receiving sensors (not shown) of the first scanner 111 and the second scanner 112 are aligned in a line in the main scanning direction of the dot impact printer 10, and perform reading in a line shape extending in the main scanning direction. The light receiving sensors of the first scanner 111 and the second scanner 112 are disposed in a range larger than a range in which the recording head 18 is capable of printing in the main scanning direction, so that reading can be performed in a width larger than the widths of all the recording mediums which are capable of being printed by the dot impact printer 10. That is, the optical reader 110 can perform reading for all surfaces of all the recording mediums S used in the dot impact printer 10.

As shown in FIG. 3, the first scanner 111 and the second scanner 112 are disposed opposite to each other with the transport path P being interposed therebetween. The light receiving sensor of the line shape included in the first scanner 111 and the light receiving sensor of the line shape included in the second scanner 112 are offset by 5 mm in the transport direction of the recording medium S. With such a configuration, it is possible to cancel influence on the other light receiving sensor due to light from the light source of one light receiving sensor and to achieve higher reading quality.

The first scanner 111 and the second scanner 112 include R, G and B light sources, respectively, and can perform a monochromic (binary, 16 gradation, 256 gradation) reading and a full color reading. Further, reading resolution of the first scanner 111 and the second scanner 112 can be set to 3 stages of 200 dpi (dot/inches), 300 dpi and 600 dpi, for example. The number of reading lines in the transport direction (sub scanning direction Y) of the recording medium S is set according to the reading resolution in the main scanning direction, and the transport speed of the recording medium S during the reading is adjusted according to conditions such as the reading resolution, a processing speed of a detection value of the light receiving sensor, or the like.

Figure 4:
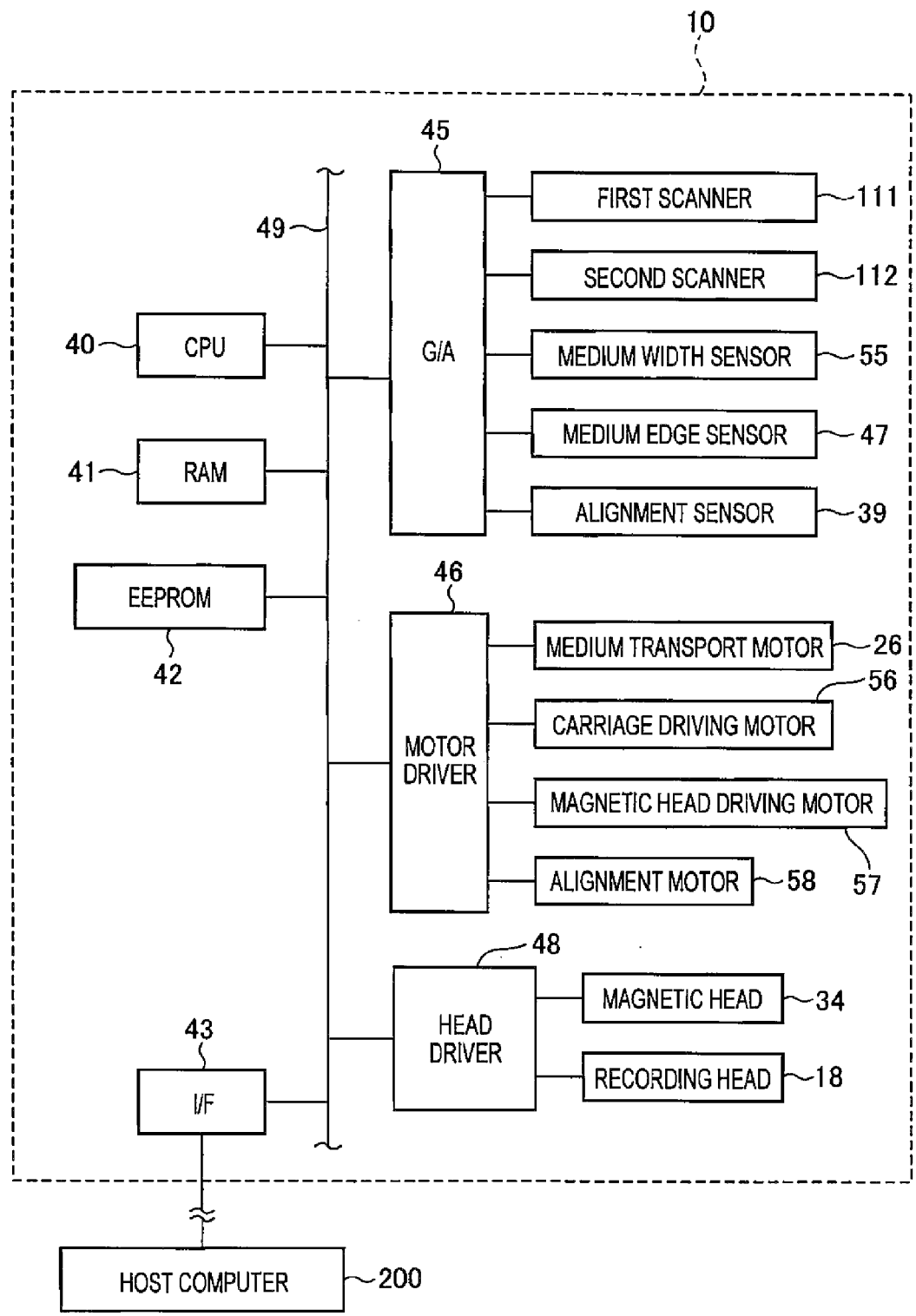
FIG. 4 is a block diagram illustrating a functional configuration of a dot impact printer.

FIG. 4 is a block diagram illustrating a configuration of a control system of the dot impact printer 10.

Respective sections shown in FIG. 4 are realized by cooperation of hardware and software mounted on a control board (not shown).

The dot impact printer 10 includes a CPU 40 which is a control section which controls the entire dot impact printer 10 on the basis of a control program, a RAM 41 which temporarily stores control programs or data or the like read from an EEPROM 42 by the CPU 40, an EEPROM 42 which stores a control program executed by the CPU 40, processed data or the like, an interface (I/F) 43 which converts a data format when information is transmitted to or received from a host computer 200 which controls the dot impact printer 10, a gate array (G/A) 45 which is connected to various sensor types, a motor driver 46 which drives various motors, and a head driver 48 which drives the head, in which the respective sections are connected to each other using a bus 49.

The RAM 41 serves as a temporary storing section and forms an image buffer (not shown) which stores read image data read by the optical reader 110.

The alignment sensor 39, the medium edge sensor 47, the medium width sensor 55, the first scanner 111 and the second scanner 112 are connected to the gate array 45. The gate array 45 quantizes an analog voltage input from the alignment sensor 39, the medium edge sensor 47 and the medium width sensor 55 into the digital data, and then outputs it to the CPU 40. The first scanner 111 and the second scanner 112 optically read the surface of the recording medium S using the CIS, and supply the detected voltage of the CIS to the gate array 45 for each pixel of the CIS. The gate array 45 quantizes the analog voltage supplied from the first scanner 111 and the second scanner 112 into the digital data, and outputs it to the CPU 40.

The motor driver 46 is connected to the medium transport motor 26, the carriage driving motor 56, and the magnetic head driving motor 57, and the alignment motor 58, supplies driving currents or driving pulses to the respective motors, and then allows these motors to operate. The alignment motor 58 (FIG. 4) which operates the alignment plates 38 (FIG. 3) or the like may be connected to the motor driver 46.

The head driver 48 is connected to the recording head 18 and the magnetic head 34, and projects a recording wire by supplying the driving currents to the recording head 18. Further, the medium edge sensor 47 detects the detection voltage (analog voltage) of the magnetic head 34 and outputs it to the CPU 40 as digital data, in a case where driving currents for reading/writing are output to the magnetic head 34 to perform reading of the magnetic data.

The CPU 40 obtains detection states of various sensors using the gate array 45, the motor driver 46 and the head driver 48, on the basis of the control program stored in the EEPROM 42, drives the respective motors to transport the recording medium S, and drives the respective heads, to thereby perform recording in the recording medium S. Further, the CPU 40 transports the recording medium S using the medium transport mechanism 100, and reads the surface of the recording medium S using the first scanner 111 and the second scanner 112 by the gate array 45. During the reading, the CPU 40 sequentially and temporarily stores the data input from the gate array 45 in a buffer memory (not shown) installed in the RAM 41. Further, the CPU 40 reads image data stored in the buffer memory (not shown) and then transmits the read image data to the host computer 200 using the interface 43.

Figure 5A:
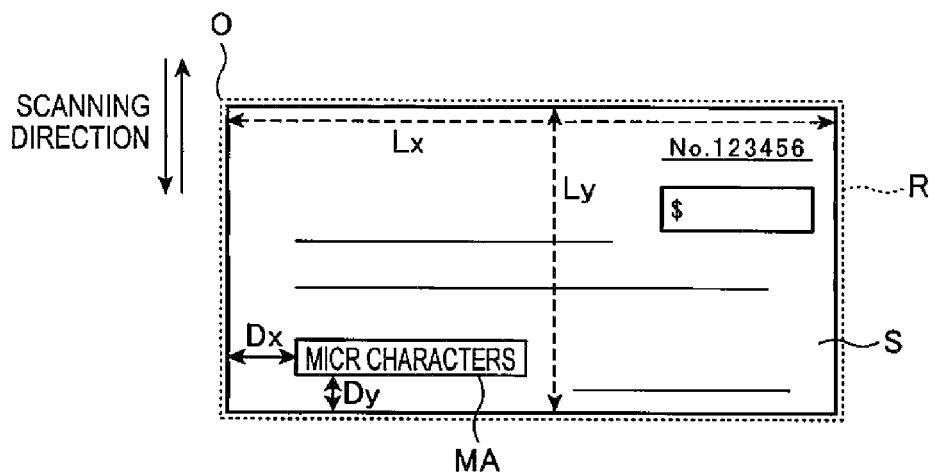
FIGS. 5A and 5B are diagrams illustrating an example of a medium which is a reading target.
Figure 5B:
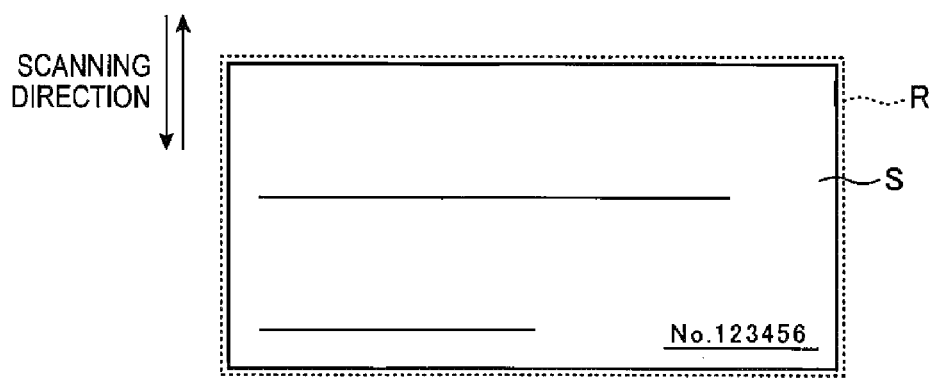

FIGS. 5A and 5B are diagrams illustrating a check as a specific example of the recording medium S processed by the dot impact printer 10. FIG. 5A illustrates a front surface, and FIG. 5B illustrates a rear surface.

The recording medium S of the check shape is a horizontally long rectangular shape, in which a long side is inserted into the dot impact printer 10 as a leading edge, and is transported in a short side direction as indicated by an arrow in the figure. Here, the length (width) of a long side direction of the recording medium S is Lx, and the length (height) in the short side direction is Ly.

As shown in FIG. 5A, sections in which an issue date, the amount of money, a destination, marker's address and name, a signature and the like are written or typed out are provided on the front surface of the recording medium S, and MICR characters are printed or typed out in a lower left area MA. Further, as shown in FIG. 5B, a serial number of the check is printed on the rear surface of the recording medium S, and sections in which a financial institution name, an account number and the like are written or typed out are provided thereon. Further, on the rear surface of the recording medium S, a serial number of the check may be printed.

The recording medium S shown in FIGS. 5A and 5B is inserted from the insert port 15 so that the rear surface in FIG. 5A faces upward in the dot impact printer 10, and the rear surface in FIG. 5B faces downward therein. The front surface in FIG. 5A corresponds to a top surface and is read by the first scanner 111. The rear surface in FIG. 5B corresponds to a bottom surface and is read by the second scanner 112.

A reading range R of the first scanner 111 is set to be slightly larger than a width Lx and a height Ly of the recording medium S, in response to the size of the recording medium S, as indicated by a dashed line in FIG. 5A. The width and height of the reading range R are obtained by adding a reading margin to the width Lx and the height Ly of the recording medium S, and the size of the reading margin is about several millimeters, for example. Thus, the first scanner 111 can optically read the entire front side surface of the recording medium S. Further, the magnetic head 34 reads the MICR characters of the area MA in FIG. 5A.

Similarly, a reading range R of the second scanner 112 is set to be slightly larger than a width Lx and a height Ly of the recording medium S, in response to the size of the recording medium S, as indicated by a dashed line in FIG. 5B. In this embodiment, the width and height of the reading range R of the second scanner 112 are the same size as the reading range R of the first scanner 111, and are obtained by adding a reading margin to the width Lx and the height Ly of the recording medium S. Thus, the second scanner 112 can optically read the entire rear surface of the recording medium S.

The dot impact printer 10 reads the recording medium S using the optical reader 110 while transporting the recording medium S in a forward direction or a backward direction along a short side direction thereof. In this case, the transport direction at the time of reading is automatically determined as described later so that a reading target portion is completely read with the shortest transport distance.

A command is transmitted to the dot impact printer 10 from the host computer 200 through an interface 43, and the size (Lx, Ly) of the recording medium S of the reading target is designated by the command. The CPU 40 specifies the size of the recording medium S on the basis of the command received from the host computer 200 and sets the reading range R. Here, the command transmitted from the host computer 200 includes information indicating the position of the area MA in the recording medium S. The position of the area MA is designated by a distance Dx from the short side of the recording medium S and a distance Dy from the long side thereof, for example. On the basis of the command, the CPU 40 controls the motor driver 46 and the head driver 48, drives the magnetic head driving motor 57 and performs reading using the magnetic head 34.

The command transmitted to the dot impact printer 10 from the host computer 200 includes a setting command, a scanning (reading) start command, and a paper discharge command. The setting command designates reading resolution, whether to perform reading for each reading surface (top surface and bottom surface), a scanning direction, a color type (color scanning or monochromic scanning), gradation in a case where the monochromic scanning is performed, LED light emitting color in a case where the monochromic scanning is performed, a reading target area (start position and end position of the area) in a case where only part of reading range R is read, or the like, in the optical reader 110. Here, coordinates of the start position and the end position in the area are expressed as coordinates using the left end of the leading edge of the reading range R as an original point O. The CPU 40 which receives the setting command obtains a value designated by the setting command as a setting value.

The scanning start command instructs the start of the reading operation to the dot impact printer 10. The scanning start command includes information designating the entire reading of the entire reading range R, or a designated area reading (partial reading) of reading only the reading target area designated by the setting command, as a reading operation to be carried out. The CPU 40 which receives the scanning start command controls the gate array 45 and the motor driver 46, to thereby start reading using the optical reader 110.

Further, the paper discharge command instructs discharge of the recording medium S through the insert port 15 or the discharge port 20 after the reading is completed, and includes information instructing paper discharge and information designating a paper discharge direction (the insert port 15 or the discharge port 20). The CPU 40 which receives the paper discharge command discharges the recording medium S from the side designated by the paper discharge command.

Next, a scanning direction setting process performed before the scanning operation will be described.

Figure 6:
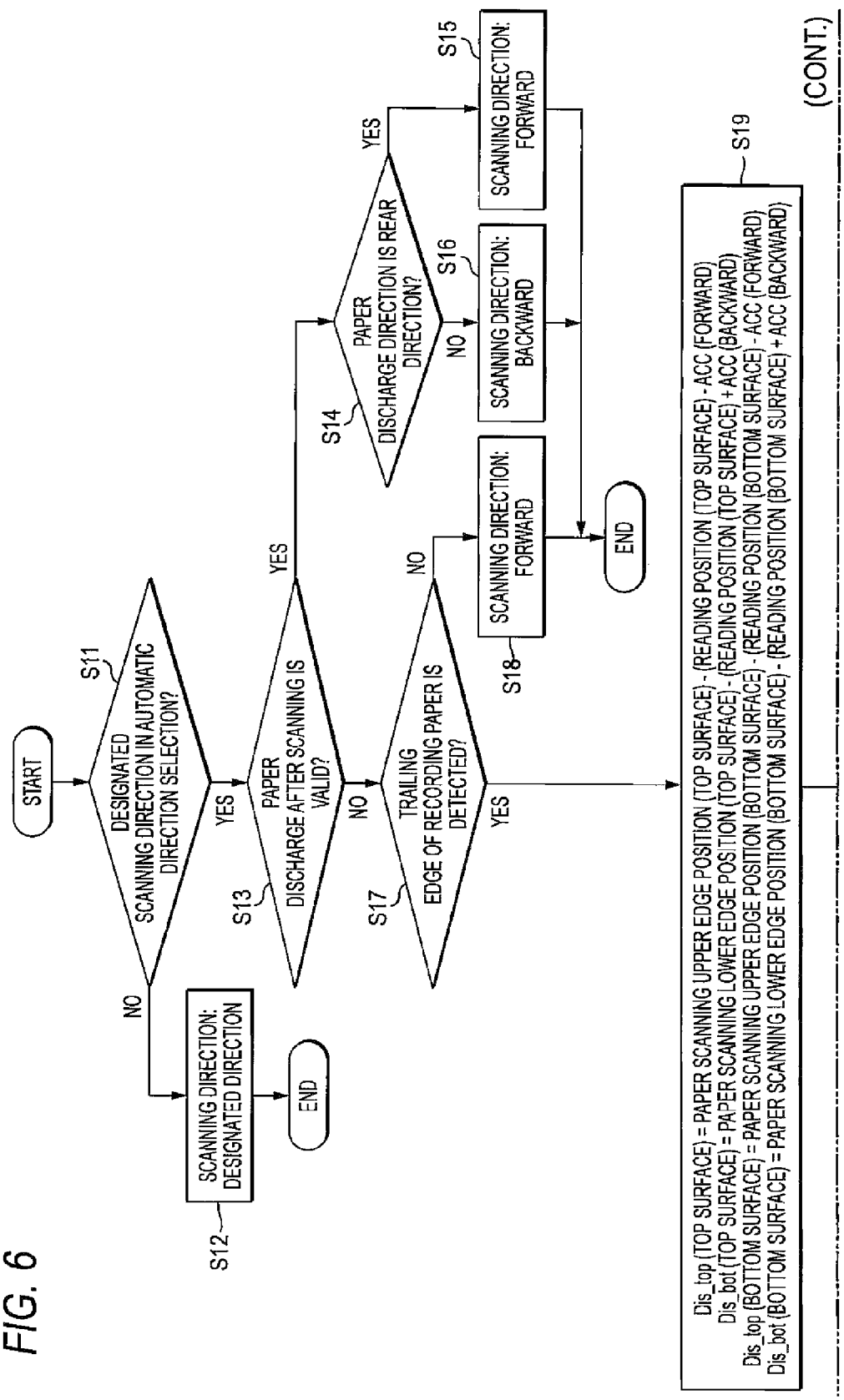
FIG. 6 is a process flowchart illustrating a scanning direction setting process.

FIG. 6 is a process flowchart illustrating a scanning direction setting process.

Hereinafter, a forward direction scanning refers to a scanning performed while the recording medium S is transferred in a direction of the discharge port 20 (forward direction in the transport direction) and a backward direction scanning refers to a scanning performed while the recording medium S is transferred in a direction of the insert port 15 (backward direction in the transport direction).

Firstly, it is determined whether the scanning direction is set to an automatic direction selection (step S11).

In the determination of step S11, if the scanning direction is not set to the automatic direction selection (step S11; No), the scanning direction is set to the designation direction, and then the scanning direction setting process is completed (step S12).

In the determination of step S11, if the scanning direction is set to the automatic direction selection (step S11; Yes), it is determined whether "paper discharge after scanning is valid" is set so that the paper discharge process is performed after scanning (step S13).

In the determination of step S13, if "paper discharge after scanning is valid" is set (step S13; Yes), since the scanning direction is determined in the paper discharge direction, it is determined whether the paper discharge direction is the direction of the discharge port 20 (rear direction) (step S14).

In the determination of step S14, if the paper discharge direction is the direction of the discharge port 20 (rear direction) (step S14; Yes), and if the scanning direction is the forward direction, since the paper discharge can be performed in the direction of the discharge port 20 (rear direction), the scanning direction is set to the forward direction, and then the scanning direction setting process is completed (step S15).

In the determination of step S14, if the paper discharge direction is not the direction of the discharge port 20 (rear direction), that is, if the paper discharge direction is the direction of the insert port 15 (front direction) (step S14; No), and if the scanning direction is the backward direction, since the paper discharge can be performed in the direction of the insert port 15 (front direction), the scanning direction is set to the backward direction, and then the scanning direction setting process is completed (step S16).

On the other hand, in the determination of step S13, if "paper discharge after scanning is valid" is not set (step S13; No), it is determined whether the trailing edge of the recording paper is completely detected by the medium edge sensor 47 (step S17).

In the determination of step S17, if the trailing edge of the recording paper is not yet detected by the medium edge sensor 47 (step S17; No), it is necessary to newly perform a paper trailing edge detecting process in order to perform scanning in the backward direction, which results in a useless operation being performed. Thus, the scanning direction is set to the forward direction, and then the scanning direction setting process is completed (step S18).

Figure 7:
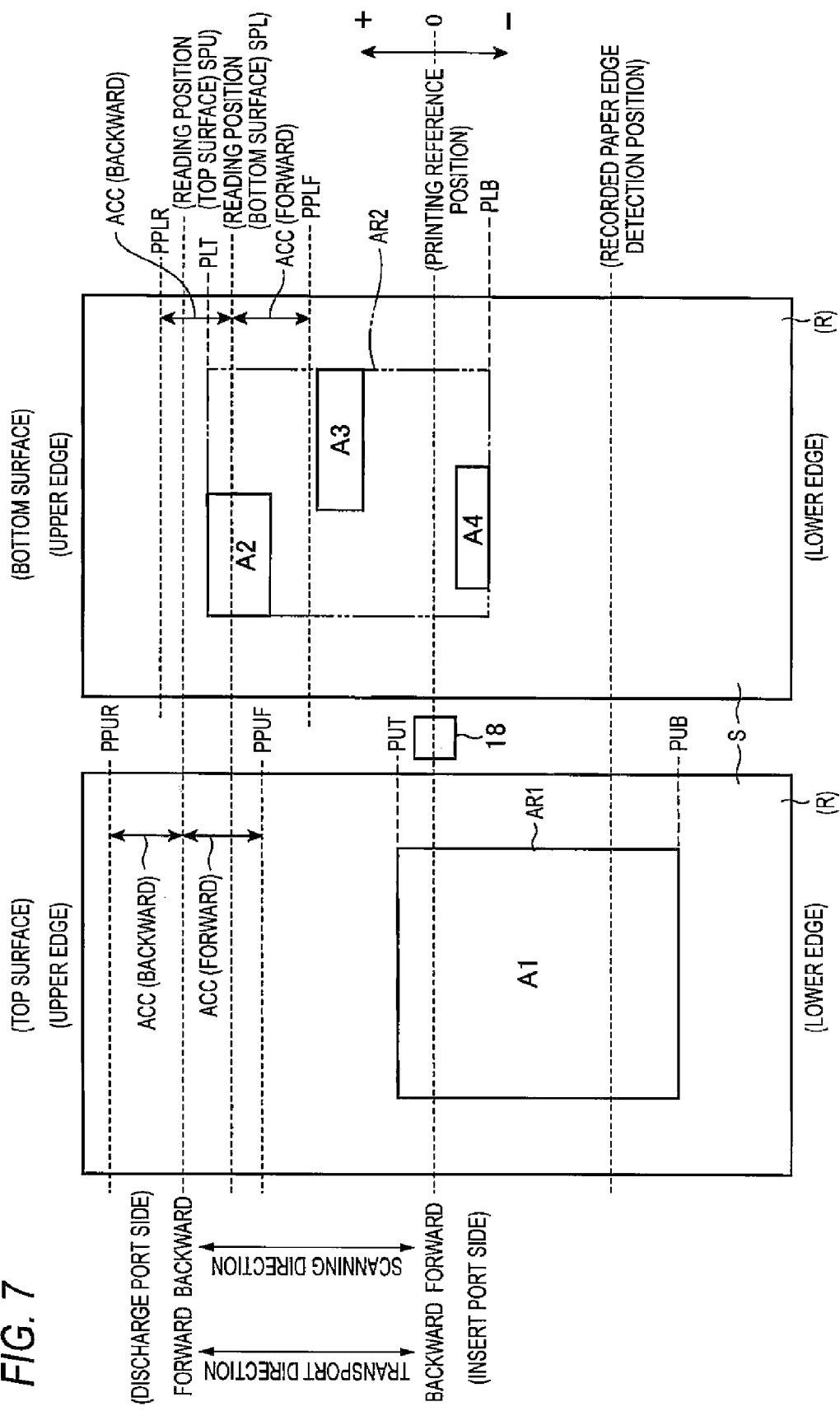
FIG. 7 is a diagram illustrating a scanning direction setting process.

FIG. 7 is a diagram illustrating the scanning direction setting process.

In this case, the scanning direction is set to the transport direction, on the basis of the position of the recording medium S before or when the reading is started or and reading positions (SPU and SPL) of the first scanner 111 and the second scanner 112 which are the optical reading sections, so that the transport distance of the recording medium S until the reading of the recording medium S is completed is shortened. That is, the transport direction of the recording medium S is set such that the transport distance of the recording medium S until the reading of the recording medium S is completed when the recording medium S is transported in the transport direction is shorter than the transport distance of the recording medium S until the reading of the recording medium S is completed when the recording medium S is transported in a direction different from the transport direction. Here, the position of the recording medium S before or when the reading is started is the position (of the reading target area) of the recording medium S before transport. Further, the recording medium S requires a distance necessary for accelerating and stabilizing a transport speed to achieve the transport speed at the time of reading, which is adjusted according to specifications such as reading resolution or processing speeds of the first scanner 111 or the second scanner 112. The position where the acceleration of the recording medium S is started is set to a top surface scanning preparation position PPUF and a top surface scanning preparation position PPUR, respectively, assuming that the forward direction scanning and the backward direction scanning are performed with respect to the reading position SPU of the first scanner 111, and is set to a bottom surface scanning preparation position PPLF and a bottom surface scanning preparation position PPLR, respectively, assuming that the forward direction scanning and the backward direction scanning are performed with respect to the reading position SPL of the second scanner 112.

In the determination of step S17, if the recording paper trailing edge is already detected by the medium edge sensor 47 (step S17; Yes), a movement amount Dis_top (top surface) up to the top surface scanning preparation position PPUF at the time when the forward direction scanning is assumed, a movement amount Dis_bot (top surface) up to the top surface scanning preparation position PPUR at the time when the backward direction scanning is assumed, a movement amount Dis_top (bottom surface) up to the bottom surface scanning preparation position PPLF at the time when the forward direction scanning is assumed, and a movement amount Dis_bot (bottom surface) up to the bottom surface scanning preparation position PPLR at the time when the backward direction scanning is assumed, are calculated (step S19).

Specifically, the movement amount Dis_top (top surface) up to the top surface scanning preparation position PPUF at the time when the forward direction scanning is assumed is defined by the number of steps of the medium transport motor 26 when the recording paper is transported in the forward direction. In this case, the medium transport motor 26 is used as a step motor.

In this case, as shown in FIG. 7, the number of steps of the medium transport motor 26 sets a printing (recording) reference position of the recording head 18 (sub scanning shaft position of the recording head 18) to zero, sets the direction of the discharge port 20 (rear direction) to positive (+), and sets the direction of the insert port 15 (front direction) to negative (−).

Accordingly, the movement amount Dis_top (top surface) up to the top surface scanning preparation position PPUF is obtained by subtracting the reading position (top surface) SPU of the first scanner 111 from a recording paper scanning upper edge position (top surface) PUT which is an upper edge position of the target area of the recording paper scanning on the top surface of the recording paper, and by adding thereto a value corresponding to the number of steps ACC (forward) of the medium transport motor 26 necessary for accelerating and stabilizing the transport speed so that the transport speed of the recording paper becomes a predetermined speed when the recording paper is transported.

The movement amount Dis_bot (top surface) up to the top surface scanning preparation position PPUR when the backward direction scanning is assumed is defined by the number of steps of the medium transport motor 26 when the recording paper is transported, in a similar way. The movement amount Dis_bot (top surface) is a value obtained by subtracting the reading position (top surface) SPU of the first scanner 111 from a recording paper scanning lower edge position (top surface) PUB which is a lower edge position of the target area of the recording paper scanning on the top surface of the recording paper surface, and by subtracting therefrom the number of steps ACC (backward) of the medium transport motor 26 necessary for accelerating and stabilizing the transport speed so that the transport speed of the recording paper becomes a predetermined speed when the recording paper is transported.

The movement amount Dis_top (bottom surface) up to a bottom surface scanning preparation position PPLF when the forward direction scanning is assumed is defined by the number of steps of the medium transport motor 26 when the recording paper is transported, in a similar way. The movement amount Dis_top (bottom surface) is a value obtained by subtracting the reading position (bottom surface) SPL of the second scanner 112 from a recording paper scanning upper edge position (top surface) PLT which is an upper edge position of the target area of the recording paper scanning on the bottom surface of the recording paper surface, and by adding thereto the number of steps ACC (forward) of the medium transport motor 26 necessary for accelerating and stabilizing the transport speed so that the transport speed of the recording paper becomes a predetermined speed when the recording paper is transported.

The movement amount Dis_bot (bottom surface) up to the bottom surface scanning preparation position PPLR when the backward direction scanning is assumed is defined by the number of steps of the medium transport motor when the recording paper is transported, in a similar way. The movement amount Dis_bot (bottom surface) is a value obtained by subtracting the reading position (bottom surface) SPL of the second scanner 112 from a recording paper scanning lower edge position (bottom surface) PLB which is an upper edge position of the target area of the recording paper scanning on the bottom surface of the recording paper surface, and by subtracting therefrom the number of steps ACC (backward) of the motor necessary for accelerating and stabilizing the transport speed so that the transport speed of the recording paper becomes a predetermined speed when the recording paper is transported.

Next, it is determined whether the movement amount Dis_top (top surface) 0 and the movement amount Dis_top (bottom surface) 0 (step S20).

In the determination of step S20, it is determined whether the upper edge sections of the entire reading areas in both of the top surface and the bottom surface of the recording medium S are positioned on the side of the discharge port 20 with reference to the first scanner 111 and the second scanner 112.

In the determination of step S20, if the movement amount Dis_top (top surface) 0 and the movement amount Dis_top (bottom surface) 0 (step S20; Yes), the scanning direction is set to the forward direction (step S21), and then the scanning direction setting process is completed.

Further, in the determination of step S20, if the movement amount Dis_top (top surface)>0 or the movement amount Dis_top (bottom surface)>0 (step S20; No), it is determined whether the movement amount Dis_bot (top surface)>0 and the movement amount Dis_bot (bottom surface)>0 (step S22).

In the determination of step S22, it is determined whether the upper edge sections of the entire reading areas in both of the top surface and the bottom surface of the recording medium S are positioned on the side of the insert port 15 with reference to the first scanner 111 and the second scanner 112.

In the determination of step S22, if the movement amount Dis_bot (top surface)>0 and the movement amount Dis_bot (bottom surface)>0 (step S22; Yes), the scanning direction is set to the backward direction (step S23), and then the scanning direction setting process is completed.

In the determination of step S22, if the movement amount Dis_bot (top surface) 0 or the movement amount Dis_bot (bottom surface) 0 (step S22; No), it is determined whether an ABS (Dis_top (top surface)) which is an absolute value of the movement amount Dis_top (top surface) or an ABS (Dis_top (bottom surface)) which is an absolute value of the movement amount Dis_top (bottom surface) uses a minimum value among the movement amount Dis_top (top surface), the movement amount Dis_top (bottom surface), the movement amounts Dis_bot (top surface) and the movement amount Dis_bot (bottom surface) (step S24).

In the determination of step S24, when the reading target areas (for example, the reading target areas AR1 and AR2 in FIG. 7) are present over the reading position of the first scanner 111 or the second scanner 112, it is determined which of the transport direction sides has the short total transport distance.

In the determination of step S24, if the ABS (Dis_top (top surface)) which is the absolute value of the movement amount Dis_top (top surface) or the ABS (Dis_top (bottom surface)) which is the absolute value of the movement amount Dis_top (bottom surface) uses a minimum value (step S24; Yes), the scanning direction is set to the forward direction (step S25), and then the scanning direction setting process is completed.

Further, in the determination of the step S24, if the ABS (Dis_top (top surface)) which is the absolute value of the movement amount Dis_top (top surface) or the ABS (Dis_top (bottom surface)) which is the absolute value of the movement amount Dis_top (bottom surface) does not use a minimum value (step S24; No), since the ABS (Dis_bot (top surface)) which is the absolute value of the movement amount Dis_bot (top surface) or the ABS (Dis_bot (bottom surface)) which is the absolute value of the movement amount Dis_bot (bottom surface) uses a minimum value among the movement amount Dis_top (top surface) and the movement amount Dis_top (bottom surface), the movement amounts Dis_bot (top surface) and the movement amount Dis_bot (bottom surface), the scanning direction is set to the backward direction (step S26), and then the scanning direction setting process is completed.

Subsequently, in a case where the recording medium S is transported in the forward direction and in the backward direction, reading operations using the dot impact printer 10 will be described.

Figure 8A:
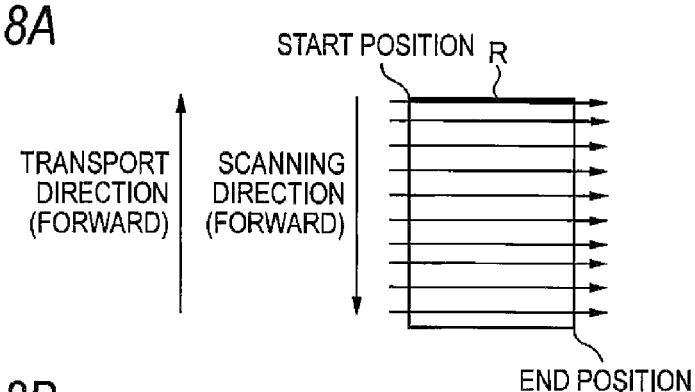
FIGS. 8A, 8B and 8C are diagrams illustrating a reading operation using an optical reader.
Figure 8B:
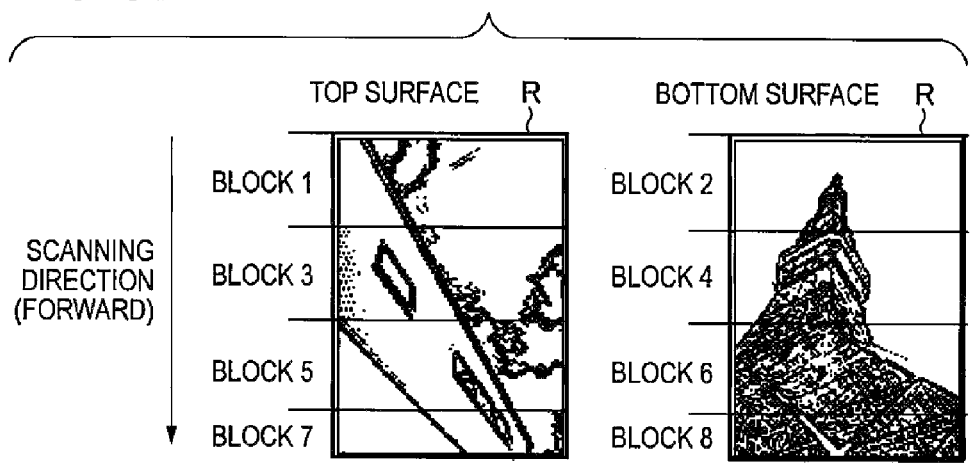
Figure 8C:
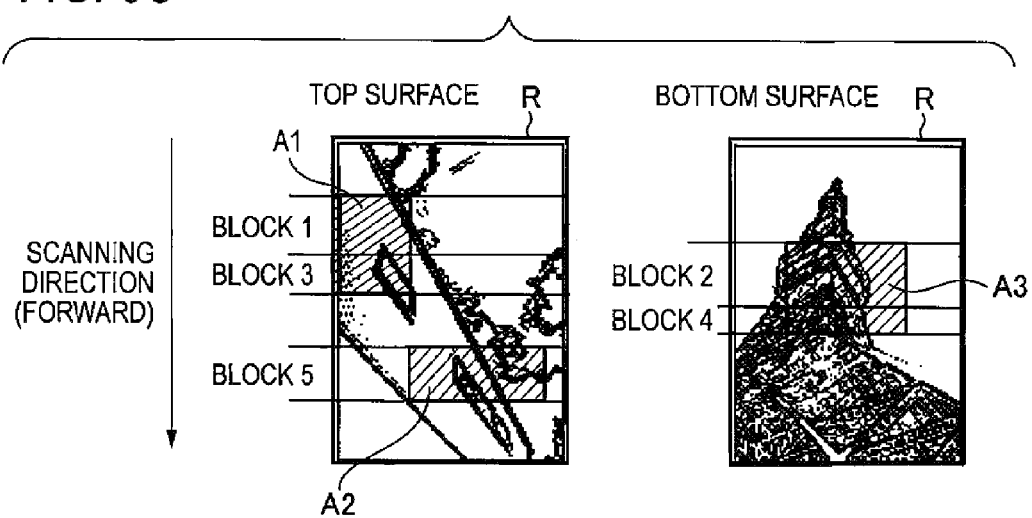

FIGS. 8A to 8C are diagrams particularly illustrating a reading operation in the forward direction, among the reading operations using the dot impact printer 10. FIG. 8A illustrates a scanning direction, FIG. 8B is a diagram schematically illustrating an entire reading operation, and FIG. 8C is a diagram schematically illustrating a designated area reading operation.

When the dot impact printer 10 performs the forward reading, while the recording medium S is transported toward a rear side (right side in FIG. 2) from a front side (left side in FIG. 2) of the dot impact printer 10 and passes through the optical reader 110, the reading is performed by the first scanner 111 and the second scanner 112.

In this case, as shown in FIG. 8A, the reading is performed over a trailing edge (lower edge in the figure) from a leading edge (upper edge in the figure) of the reading range R. Further, read images of one line read by the first scanner 111 and the second scanner 112 are sequentially output using the gate array 45 from the left end of the reading range R. Accordingly, the left end of the leading edge of the reading range R becomes a reading start position, and the right end of the trailing edge thereof becomes a reading end position.

As shown in FIG. 8B, when performing the entire reading according to the command transmitted from the host computer 200, the CPU 40 divides the reading range R into portions having a predetermined length in the scanning direction (sub scanning direction Y). Here, each divided portion is referred to as a block. The reading range R of the first scanner 111 and the reading range R of the second scanner 112 are divided into a plurality of blocks each having a predetermined length. In each block, numbers are alternately given to the top surface and the bottom surface in order, from a leading part of the scanning direction. Specifically, a leading part of the reading range R on the top surface is numbered as a block 1 and a leading part of the reading range R on the bottom surface is numbered as a block 2. Hereinafter, a block 3, a block 4, . . . , a block 8 are numbered along the scanning direction. The length of the block in the trailing edge is the length of a portion remaining after the length of the reading range R is divided by a predetermined length.

Each block is a unit of the process of transmitting the read images of the first scanner 111 and the second scanner 112 to the host computer 200. That is, when the read image data corresponding to one block is stored in an image buffer (not shown) of the RAM 41, the CPU 40 transmits the read image data corresponding to one block to the host computer 200. The predetermined length, that is, the length of the block in the transport direction (scanning direction) is determined according to the capacity of the image buffer (not shown) installed in the RAM 41. For example, when the image buffer has the capacity to store 300 lines of read image data having the maximum resolution (600 dpi) and being full color, the length of the block is set to an appropriate length of 300 lines or less.

When performing the entire reading, the CPU 40 controls the motor driver 46 to rotate the medium transport motor 26, and transports the recording medium S at a predetermined speed. Further, the CPU 40 controls the gate array 45 to emit light sources of the first scanner 111 and the second scanner 112, generates read image data on the basis of the detection value of the light receiving sensor, and stores the read image data in the image buffer of the RAM 41 for each line.

The CPU 40 continues the operation without stopping transport of the recording medium S until the entire reading range R is read by the first scanner 111 and the second scanner 112. When any block reading is completed during the operation and the read image data corresponding to one block is stored in the image buffer of the RAM 41, the CPU 40 reads the read image data corresponding to one block from the image buffer, transmits it to the host computer 200, and removes the read image data which is completely transmitted from the image buffer. By removing the read image data, a large space occurs again in the image buffer, and then the read image data thereafter can be stored.

Whenever one block reading is completed, the CPU 40 transmits the read image data to the host computer 200 as described above. A transmission order of the read image data of each block is an order in which the reading is completed and is not limited to the numerical order of the blocks.

When transmitting the read image data to the host computer 200, the CPU 40 adds information such as the read surface (top surface or bottom surface), the size of the read block, the block number, the data length, and the like to the read image data to be transmitted, as a header. Further, in a case where the data amount of the read image data is large, the CPU 40 may divide the read image data of one block to be transmitted. In this case, the CPU 40 may add information for combination of the divided read image data in the host computer 200 as the header.

Further, when the designated area reading is performed according to the command received from the host computer 200, as shown in FIG. 8C, the CPU 40 arranges areas of the reading target designated by the setting command in the reading range R. In an example of FIG. 8C, areas A1 and A2 are arranged in the reading range R on the top surface, and an area A3 is arranged in the reading range R on the bottom surface.

The CPU 40 arranges blocks according to the areas of the arranged reading target. Here, if the lengths in the scanning direction of the arranged areas are shorter than the lengths of the above-described blocks, the CPU 40 sets one area as one block. A leading edge and a trailing edge of the block coincide with a leading edge and a trailing edge of the area. If the length of the area is longer than the predetermined length, the CPU 40 divides the area of the reading target into portions having a predetermined length from a leading part side of the scanning direction. In the example of FIG. 8C, since the areas A1 and A3 exceed the predetermined length, the area A1 is divided into blocks 1 and 3, and the area A3 is divided into blocks 2 and 4. The numbers of the blocks are alternately given to the top surface and the bottom surface in order, from a leading edge of the block, in a similar way to the case of the entire reading.

In a case where the plurality of areas of the reading target is arranged in the width direction of the reading range R and overlaps with each other in the scanning direction, all the overlapped areas become one cluster block. In a case where the length of one cluster block exceeds the upper limit of the length of the block, the one cluster block is divided into a plurality of blocks in the scanning direction.

Then, the CPU 40 starts reading the areas A1 to A3 of the reading range R. The CPU 40 controls the gate array 45 and the motor driver 46 to continue the reading operation without stopping transport of the recording medium S until the entire areas are read by the first scanner 111 and the second scanner 112. When any block reading is completed during the operation and the read image data corresponding to one block is stored in the image buffer of the RAM 41, the CPU 40 reads the read image data corresponding to one block from the image buffer, transmits it to the host computer 200, and removes the read image data which is completely transmitted from the image buffer. In this case, the transmission order is the order in which the reading is completed, in a similar way to the entire reading, and is not limited to the numerical order of the blocks.

Further, when the CPU 40 transmits the read image data to the host computer 200, the header added to the read image data includes information such as the read surface (top surface or bottom surface), the size of the read block, the block number, the data length and the like, and information such as an area number, coordinates of the start and end positions of the area and the like. In a case where one area is divided into a plurality of blocks, the CPU 40 may include information for the combination of blocks forming each area. Further, when the plurality of areas is included in one block, the CPU 40 cuts the read image data of the block for each area and then transmits it to the host computer 200 for each area. In the case of the designated area reading, the CPU 40 may divide the read image data having a large data amount and transmit it to the host computer 200.

The host computer 200 receives the read image data transmitted from the dot impact printer 10, to reform the read image for each block. Further, when the entire reading is designated by the setting command transmitted to the dot impact printer 10, the host computer 200 combines the blocks with respect to each of the top surface and the bottom surface to generate the entire read image data of the reading range R. Further, when the designated area reading is designated by the setting command, if one area is divided into a plurality of blocks, the host computer 200 combines these blocks. Further, if one area forms one block, the host computer 200 uses the read image data of the block as it is and generates the read image data for each area.

Figure 9A:
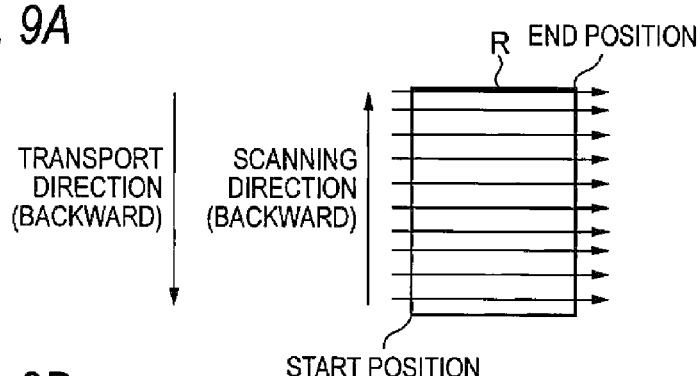
FIGS. 9A, 9B and 9C are diagrams illustrating a reading operation using an optical reader.
Figure 9B:
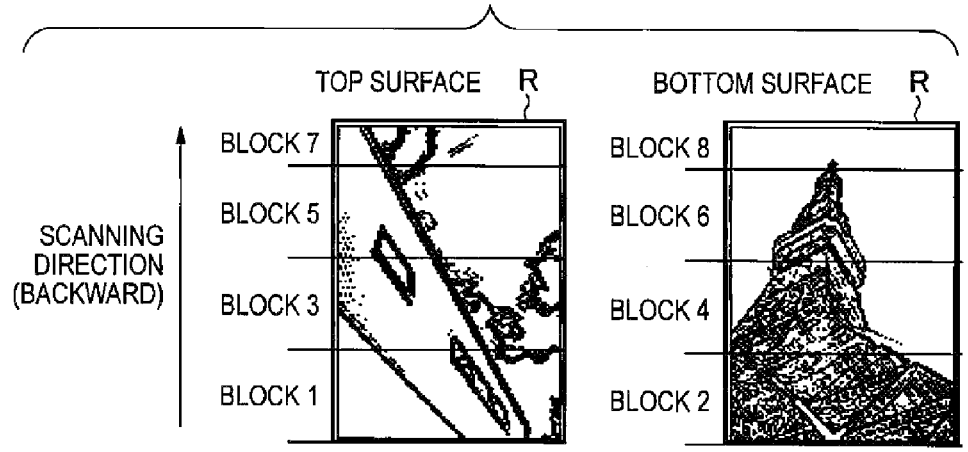
Figure 9C:
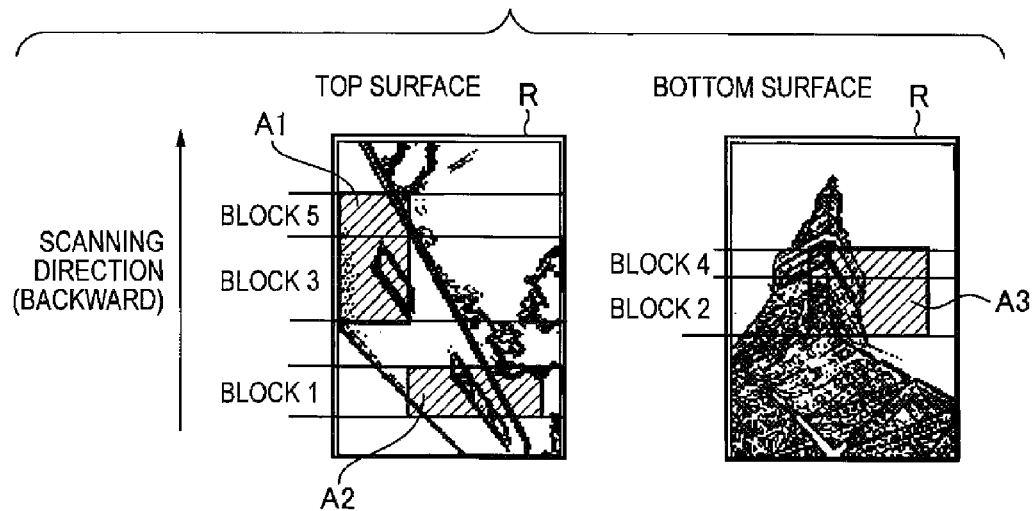

FIGS. 9A to 9C are diagrams particularly illustrating a reading operation in the backward direction, among the reading operations using the dot impact printer 10. FIG. 9A illustrates a scanning direction, FIG. 9B is a diagram schematically illustrating an entire reading operation, and FIG. 9C is a diagram schematically illustrating a designated area reading operation.

When the dot impact printer 10 performs the backward reading, while the recording medium S is transported toward the front side from the rear side of the dot impact printer 10 and passes through the optical reader 110, the reading is performed by the first scanner 111 and the second scanner 112. In this case, as shown in FIG. 9A, the reading is performed over a leading edge (upper edge in the figure) of the reading range R from a trailing edge (lower edge in the figure) thereof. Read images of one line read by the first scanner 111 and the second scanner 112 are sequentially output one line at a time through the gate array 45 from the left end (origin of arrow) of the reading range R to the right end (destination of arrow). Thus, the left end of the trailing edge of the reading range R becomes a reading start position, and the right end of the leading edge becomes a reading end position.

As shown in FIG. 9B, when the entire reading is performed in the backward direction, the reading range R is divided into blocks from the trailing edge. In this case, the block numbers are alternately given to the top surface and the bottom surface in order, from the side which becomes a leading part at the time of reading. Other operations are the same as in the entire reading in the forward direction.

Further, as shown in FIG. 9C, when the designated area reading is performed in the backward direction, the reading target areas are arranged according to the setting command received from the host computer 200, and then blocks are arranged from the trailing edge side of the reading range R which is the leading part in the scanning direction. Further, an area which exceeds an upper limit of the length of the block is divided by a predetermined length with reference to the trailing edge side of the reading range R. Other operations are the same as in the designated area reading in the forward direction.

The read image data read in the backward direction is vertically inverse to the read image data in the forward direction. Thus, the CPU 40 of the dot impact printer 10 may perform a process of inverting the read image data and transmitting it to the host computer 200. However, since the host computer 200 which has transmitted the setting command has information about the scanning direction, the host computer 200 may perform a process of vertically inverting the read image data on the basis of the information.

Figure 10:
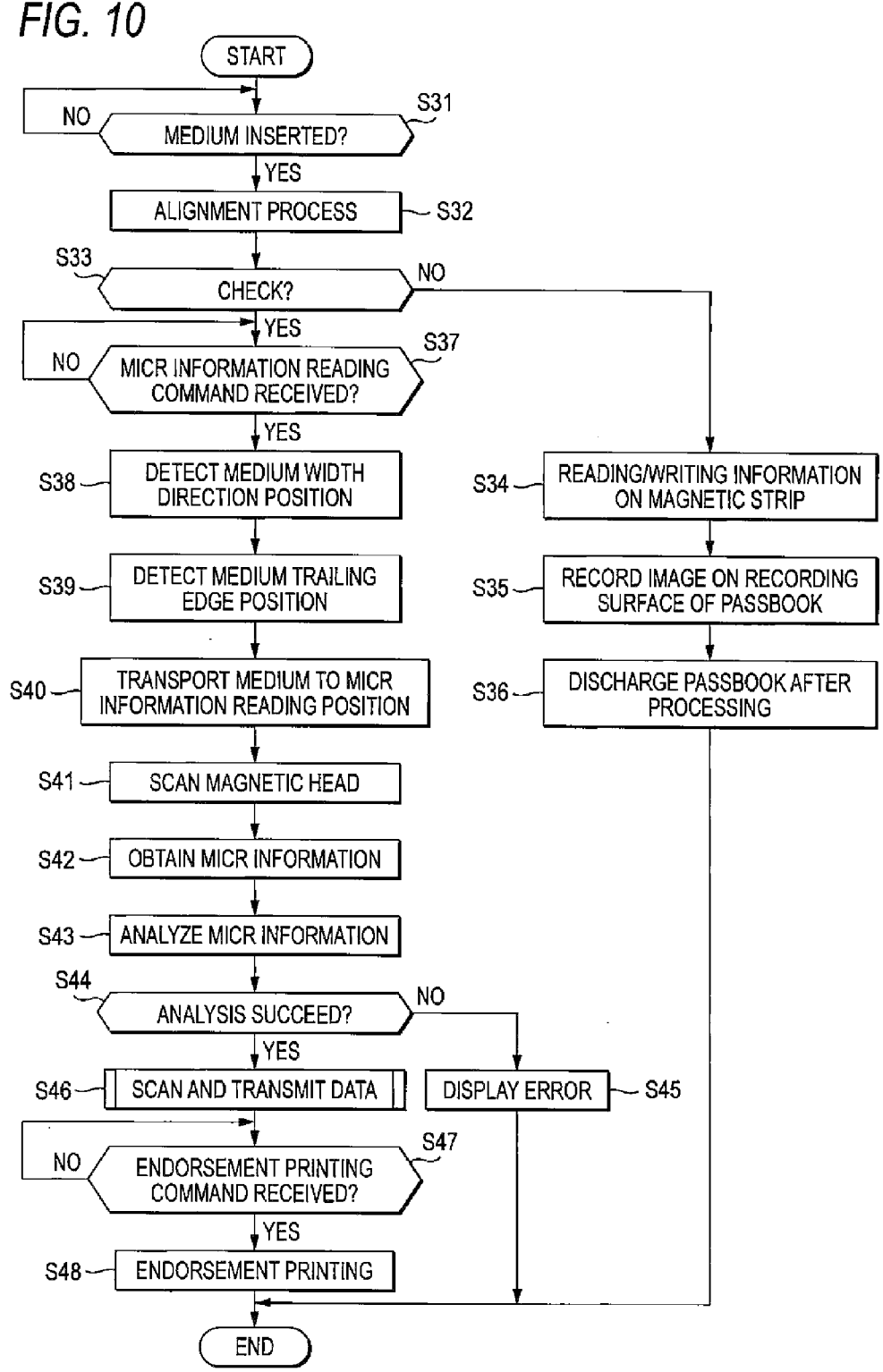
FIG. 10 is a flowchart illustrating an operation of a dot impact printer.

FIG. 10 is a flowchart illustrating an operation of the dot impact printer 10 according to the present embodiment.

Firstly, if the recording medium S is inserted into the insert port 15 and then the leading edge of the recording medium S is detected by the medium edge sensor 47 (step S31; Yes), the CPU 40 of the dot impact printer 10 allows the array plate 38 to protrude within the transport path P of the recording medium S, and allows the medium transport motor 26 to operate to align the recording medium S (step S32).

Then, the CPU 40 determines whether the detected recording medium S is a check or a passbook (step S33). Here, the CPU 40 may obtain information transmitted from the host computer 200, and may determine the type of the recording medium S on the basis of the information, or may detect the position of the leading edge or the side edge of the recording medium S using the medium edge sensor 47 or the medium edge sensor 55, and may determine the type of the recording medium S on the basis of the position or the size. Further, the CPU 40 may perform recording of the MICR information by the magnetic head 34 on the basis of the position of the leading edge or the side edge of the recording medium S detected using the medium edge sensor 47 or the medium width sensor 55, and may determine whether the MICR information exists in the area MA according to the reading, to thereby determine the type of the recording medium S. In this embodiment, the CPU 40 obtains information for specifying the type (check or passbook) of the recording medium S, information relating to the size of the check, information relating to the position of the area MA and information relating to the transport distance when the recording medium S is the check, from the host computer 200, and determines whether it is the check or the passbook on the basis of the information.

In the determination of step S33, when the recording medium S is not a check (step S33; No), the CPU 40 determines that the recording medium S is a passbook, for example, and performs reading of a magnetic strip installed in the passbook. Thus, the CPU 40 transports the recording medium S up to the position which is readable by the magnetic head 34 and performs reading and/or writing of the magnetic strip by the magnetic head 34 (step S34). Further, the CPU 40 transports the recording medium S to the position of the recording head 18 to perform recording on the recording surface using the recording head 18 (step S35), discharges the recording medium S from the insert port 15 (step S36), and then terminates the operation.

In the determination of step S33, if the recording medium S is a check (step S33; Yes), the CPU 40 determines whether the reading command of the MICR information is received from the host computer 200 (step S37).

Further, in the determination of step S37, if it is determined that the reading command of the MICR information is received (step S37; Yes), the CPU 40 allows the alignment plate 38 to retreat from the transport path P, and transports the recording medium S by the medium transport mechanism 100 until at least the leading edge of the recording medium S reaches right under the medium width sensor 55. Then, the CPU 40 drives the carriage driving motor 56 (FIG. 4) to scan the carriage 19 in the main scanning direction, and detects the position of the width direction of the recording medium S on the basis of the output signal from the medium width sensor 55 and the position of the main scanning direction of the carriage 19 (step S38). Further, the CPU 40 monitors the output signal of the medium edge sensor 47 while transporting the recording medium S by the medium transport mechanism 100, and detects the position of the trailing edge of the recording medium S (step S39).

Next, the CPU 40 transports the recording medium S by the medium transport mechanism 100 up to the position where the area MA can be read by the magnetic head 34 (step S40), controls the motor driver 46 to operate the magnetic head driving motor 57, and performs reading of the MICR characters displayed on the area MA by the magnetic head 34 (step S41). The information (MICR information) read by the magnetic head 34 is digitalized by the gate array 45, and the CPU 40 obtains the digital data (step S42), analyzes the character information on the basis of the data, and converts it to text information (step S43). Here, it is determined whether unanalyzable characters are present in excess of a preset number (step S44). If the unanalyzable characters exceeding the preset number are present (step S44; Yes), the CPU 40 outputs an error, discharges the recording medium S (step S45), and then terminates the operation. In step S15, the CPU 40 may notify the error generation by a display section or the like provided in the dot impact printer 10, transmit information indicating the error generation to the host computer 200, or may perform both the notification and transmission.

On the other hand, in the determination of step S44, if the number of the unanalyzable characters does not exceed the preset number (step S44; No), the CPU 40 performs scanning by the optical reader 110 and transmits the read image data to the host computer 200 (step S46).

Further, the CPU 40 waits until an endorsement printing performance command is received from the host computer 200 (step S47). If the endorsement printing performance command is received (step S47; Yes), the CPU 40 rotates the medium transport motor 26 backward to transport the recording medium S up to under the recording head 18, and also drives the carriage driving motor 56 and the recording head 18 to perform endorsement printing which indicates completion of the process on the rear surface of the recording medium S (step S48). Then, if the endorsement printing is completed, the CPU 40 further rotates the medium transport motor 26, and discharges the recording medium S through the insert port 15 or the discharge port 20.

Figure 11:
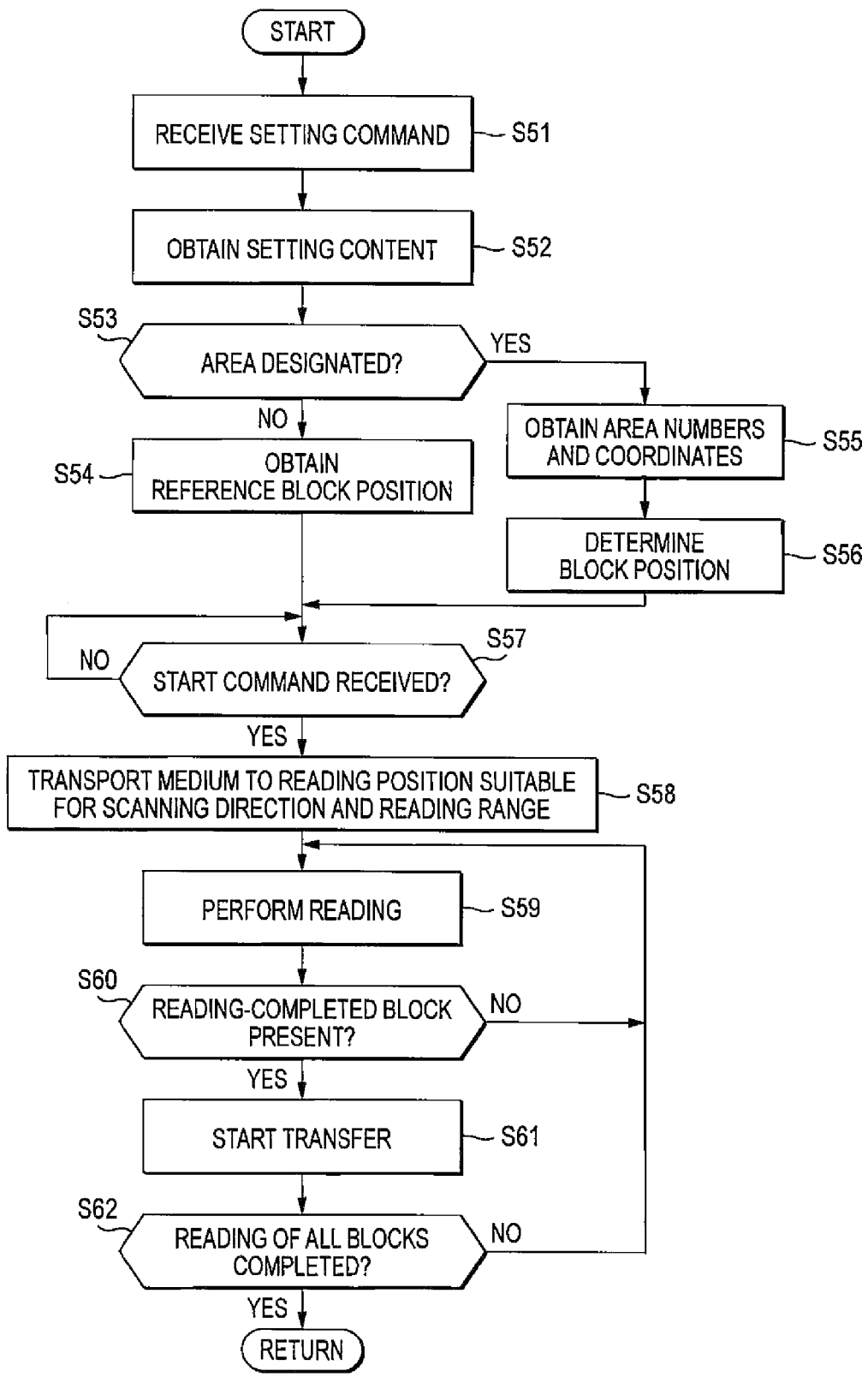
FIG. 11 is a flowchart illustrating an operation of a dot impact printer.

FIG. 11 is a flowchart illustrating the reading operation performed by the dot impact printer 10, which specifically illustrates the operation in step S16 of FIG. 10.

The CPU 40 receives the setting command transmitted from the host computer 200 (step S51), and obtains a variety of setting contents designated by the setting command (step S52). Here, the CPU 40 determines whether the reading target area is designated by the setting command (step S53). If the area is not designated (step S53; No), the CPU 40 obtains the position of a block which is a reference for reading the entire reading range R, on the basis of the scanning direction designated by the setting command (step S54). The block position, when the entire reading of the reading range R is performed, is stored in the EEPROM 42, for example.

Further, if the reading target area is designated by the setting command (step S53; Yes), the CPU 40 obtains area numbers and coordinates of the start position and the end position of each area (step S55) and arranges the areas in the reading range R. Further, the CPU 40 determines the position of the block suitable for the area on the basis of the scanning direction designated by the setting command (step S56).

After obtaining or determining the block position, the CPU 40 waits until a scanning start command is received from the host computer 200 (step S57). If the scanning start command is received (step S57; Yes), the recording medium S is transported up to the scanning start position of the optical reader 110 by the medium transport mechanism 100 in a direction where the transport distance is relatively short, on the basis of the scanning direction designated by the setting command, whether the reading is the entire reading or the designated area reading, the position of the designated area in the case of the designated area reading, and a current position of the reading medium S (step S58).

Further, the CPU 40 performs reading using the first scanner 111 and the second scanner 112 while transporting the recording medium S (step S59).

During the reading, the CPU 40 determines the presence or absence of the block in which the reading is completed (step S60). If there is a block in which the reading is completed (step S60; Yes), the CPU 40 starts a process of reading the read image data of the block from the image buffer of the RAM 41 and transferring it to the host computer 200 (step S61), and then, if the transfer is completed, the CPU 40 removes the read image data of the involved block in the image buffer. The CPU 40 determines whether reading of all the blocks is completed (step S62).

In the determination of step S62, if there is a block in which the reading is not completed (step S62; No), the CPU 40 returns the procedure to step S59 and continues the reading operation. Here, if there is a block in which the reading is newly completed, the CPU 40 transmits the read image data of the block.

Further, in the determination of step S62, if the reading of all the blocks in the reading range R of both of the front and rear surfaces is completed (step S62; Yes), the CPU 40 terminates the reading operation.

As described above, the light receiving sensors of the first scanner 111 and the second scanner 112 are arranged to be offset from each other. In this embodiment, the light receiving sensor of the first scanner 111 is offset toward the front side by 5 mm. Thus, in a case where the scanning is performed in the forward direction, the reading range R on the top surface is completely read prior to the reading range R on the bottom surface, and in a case where the scanning is performed in the backward direction, the reading range R on the bottom surface is completely read prior to the reading range R on the top surface.

As described above, in the dot impact printer 10 according to the present embodiment of the present invention, since the CPU 40 sets the transport direction at the time of reading the recording medium S so that the transport distance of the recording medium S, until the recording medium S is completely read, is shortened before the reading of the first scanner 111 or the second scanner 112, the recording medium S is prevented from being uselessly transported, to thereby enhance effective throughput.

In this case, in a case where the discharge direction of the medium is determined in advance, the transport direction when the medium is read by the first scanner 111 or the second scanner 112 is set to coincide with the discharge direction, and thus, even in a case where the discharge direction is determined in advance, it is possible to reliably suppress the useless transporting of the medium and to enhance the throughput.

Further, the optical reader 110 includes the first scanner 111 which reads one surface of the recording medium S and the second scanner 112 which reads the other surface of the recording medium S which are arranged at the opposite sides of the transport path P, respectively, and thus, it is possible to read both surfaces of the recording medium S. The CPU 40 allows the blocks set in the reading range R of the first scanner 111 and the second scanner 112 to be read. Then, if the reading of any block is completed, even before the reading is completed for other blocks which are set in the reading range R on the same surface as the block or the reading range R on the other surface thereof, the CPU 40 allows the read image data of the block in which the reading is completed to be read from the image buffer and transmits it. Thus, it is possible to reduce the waiting time relating to the transmission of the read image data to thereby perform the reading of both surfaces of the recording medium S at high speed. Further, the image buffer of the RAM 41 may have a small capacity compared with the case where the image data read from both surfaces is stored.

Hereinbefore, the exemplary embodiment according to the present invention has been described, but the present invention is not limited thereto. For example, in the above-described embodiment, both surfaces of the recording medium S are read together, but one side of the recording medium S may be read in a similar way.

Further, as an example, the alignment mechanism 28, the recording head 18 and the optical reader 110 are sequentially arranged on the transport path P of the recording medium S, but the present invention is not limited thereto. The respective elements may be arranged in an arbitrary manner For example, the optical reader 100 may be arranged at the position closest to the insert port 15.

In addition, in the above-described embodiment, the control section mounted on the control board (not shown) mounted on the dot impact printer 10 has the functions indicated by the function blocks in FIG. 4, and controls the respective sections of the dot impact printer 10, as an example. However, for example, the device externally connected to the dot impact printer 10 functions as the respective function sections shown in FIG. 4, and may control the operations of the dot impact printer 10. Further, since the respective function blocks in FIG. 4 are realized by cooperation of hardware and software, the specific mounting type of hardware and the software specifications or the like are arbitrary, whereby it is possible to arbitrarily change the configuration to other detailed configurations.

Further, in the above-described embodiment, the first scanner 111 and the second scanner 112 can perform the monochromic scanning and the color scanning using light sources of R, G and B, but for example, may perform reading using infrared rays using a light source emitting infrared light. Since the magnetic ink has a high absorption regarding infrared rays compared with normal ink, it is possible to capture only characters printed by the magnetic ink using the infrared rays, and it is possible to optically read the MICR information on the area MA with high efficiency.

Further, in the above-described embodiment, as an example, the present invention is applied to a flatbed-type device which horizontally transports the recording medium S, but the present invention is not limited thereto. For example, the present invention may be applied to a device including a transport path in which the recording medium S of a business form such as a check is transported in an upright state. Further, in the above-described embodiment, the dot impact printer 10 including the optical reader 110 is exemplified, but the present invention is not limited thereto. For example, an optical reading section corresponding to the optical reader 110 may be installed in an ink jet printer, a thermal printer, a laser printer or the like. Furthermore, the optical reading section corresponding to the optical reader 110 may be installed in a device assembled in a different device (ATM (automated teller machine), CD (cash dispenser) or the like) in addition to a device used as an independent printer.

Further, the present invention is not limited to a configuration in which the optical reader 110 is installed integrally with a device which records characters or images on a recording medium such as a recording paper. For example, the present invention can be applied to various devices including an independent scanner device or a copy machine.

What is claimed is:

1. An optical reader, comprising:
    a transport section capable of transporting a medium which is a reading target in forward and backward directions along a transport path;
    an optical reading section installed in the transporting path, the optical reading section that optically reads the medium that is transported by the transport section;
    and a control section that (a) sets a transport direction of the medium to a first transport direction at a time of reading of the medium on the basis of (1) a position of the medium before or when the reading of the medium is started and (2) a reading position of the optical reading section, such that a first transport distance of the medium until the reading of the medium is completed is shortened relative to a second transport distance until the reading of the medium is completed corresponding to a second transport direction different than the first transport direction, and
    (b) controls the transport section and the optical reading section.

2. The optical reader as set forth in claim 1, wherein the control section sets the transport direction of the medium on the basis of arrangement of edge positions of both edges of a reading target area along the transport direction of the medium before or when the reading of the medium is started and the reading position of the optical reading section.

3. The optical reader as set forth in claim 1, wherein
    the optical reading section includes a first reading section that reads one surface of the medium and a second reading section that reads the other surface of the medium, the first reading section and the second reading section being respectively disposed on both sides of the transport path, and
    wherein the control section sets the transport direction of the medium such that the first transport of the medium until the reading of the medium by the first reading section and the second reading section is completed is shortened relative to the second transport distance of the medium until the reading of the medium by the first reading section and the second reading section is completed corresponding to the second transport direction different than the transport direction, in a case where the reading of both surfaces of the medium is performed simultaneously by the first reading section and the second reading section.

4. The optical reader as set forth in claim 1, wherein the control section sets the first transport direction of the medium to a direction that results in a first reading preparation position that is closer to an edge portion of a reading target area of the medium than a second reading preparation position of a direction opposite to the first direction.

5. The optical reader as set forth in claim 1, wherein the control section sets the transport direction of the medium so as to coincide with a discharge direction of the medium, in a case wherein the discharge direction of the medium is determined in advance of movement of the medium.

6. A control method of an optical reader including a transport section capable of transporting a medium which is a reading target in forward and backward directions along a transport path; and an optical reading section installed in the transporting path, the optical reading section that optically reads the medium which is transported by the transport section, the control method comprising:
    setting a transport direction of the medium at the time of reading of the medium on the basis of (1) a position of the medium before or when the reading of the medium is started and (2) a reading position of the optical reading section such, that a first transport distance of the medium until the reading of the medium is completed is shortened relative to a second transport distance until the reading of the medium is completed corresponding to a second transport direction different than the transport direction; and
    controlling the transport section and the optical reading section on the basis of the set transport direction.

7. The control method as set forth in claim 6, wherein the controlling includes setting the transport direction of the medium so as to coincide with a discharge direction of the medium, in a case wherein the discharge direction of the medium is determined in advance of movement of the medium.

8. The control method as set forth in claim 6, wherein the controlling includes setting the transport direction of the medium on the basis of arrangement of edge positions of both edges of a reading target area along the transport direction of the medium before or when the reading of the medium is started and the reading position of the optical reading section.

9. The control method as set forth in claim 6, wherein the optical reading section includes a first reading section that reads one surface of the medium and a second reading section that reads the other surface of the medium, the first reading section and the second reading section being respectively disposed on both sides of the transport path, and wherein the controlling includes setting the transport direction of the medium such that the first transport distance of the medium until the reading of the medium by the first reading section and the second reading section is completed is shortened relative to the second transport distance of the medium until the reading of the medium by the first reading section and the second reading section is completed corresponding to the second transport direction different than the transport direction, in a case where the reading of both surfaces of the medium is performed simultaneously by the first reading section and the second reading section.

10. The control method as set forth in claim 6, wherein the controlling includes setting the transport direction of the medium to a first direction that results in a first reading preparation position that is closer to an edge portion of a reading target area of the medium than a second reading preparation position of a direction opposite to the first direction.

11. A non-transitory computer-readable recording medium that stores a program which causes a control section that controls an optical reader including a transport section capable of transporting a medium which is a reading target in forward and backward directions along a transport path; and an optical reading section installed in the transporting path, the optical reading section that optically reads the medium which is transported by the transport section, to perform a control method comprising:
- setting a transport direction of the medium at the time of reading of the medium on the basis of (1) a position of the medium before or when the reading of the medium is started and (2) a reading position of the optical reading section, such that a first transport distance of the medium until the reading of the medium is completed is shortened relative to a second transport distance corresponding to a second transport direction different than the transport direction;
- controlling the transport section to transport the medium on the basis of the set transport direction; and
- controlling the optical reading section to optically read the medium on the basis of the set transport direction.

* * * * *